US011842035B2

(12) United States Patent
Jahjah et al.

(10) Patent No.: US 11,842,035 B2
(45) Date of Patent: Dec. 12, 2023

(54) TECHNIQUES FOR LABELING, REVIEWING AND CORRECTING LABEL PREDICTIONS FOR PANDIDS

(71) Applicant: Bentley Systems, Incorporated, Exton, PA (US)

(72) Inventors: Karl-Alexandre Jahjah, Quebec (CA); Marc-André Gardner, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 184 days.

(21) Appl. No.: 17/128,912

(22) Filed: Dec. 21, 2020

(65) Prior Publication Data
US 2022/0043547 A1 Feb. 10, 2022

Related U.S. Application Data

(60) Provisional application No. 63/060,862, filed on Aug. 4, 2020.

(51) Int. Cl.
*G06F 3/0484* (2022.01)
*G06N 20/00* (2019.01)
(Continued)

(52) U.S. Cl.
CPC .......... *G06F 3/0484* (2013.01); *G06F 3/0481* (2013.01); *G06N 20/00* (2019.01);
(Continued)

(58) Field of Classification Search
CPC ................ G06F 3/0484; G06F 3/0481; G06F 2203/04806; G06N 20/00; G06N 3/08;
(Continued)

(56) References Cited

U.S. PATENT DOCUMENTS 5,625,798 A 4/1997 Badders et al.
8,977,527 B2 3/2015 McKim et al.
(Continued)

FOREIGN PATENT DOCUMENTS

EP 3660743 A1 6/2020
WO WO-2020/005541 A1 1/2020

OTHER PUBLICATIONS

U.S. Appl. No. 17/034,844, filed Sep. 28, 2020 by Marc-André Lapointe, et al. for Classifying Individual Elements of an Infrastructure Model, pp. 1-27.
(Continued)

*Primary Examiner* — Keith D Bloomquist
(74) *Attorney, Agent, or Firm* — Cesari and McKenna, LLP; James A. Blanchette

(57) ABSTRACT

In example embodiments, techniques are provided for efficiently labeling, reviewing and correcting predictions for P&IDs in image-only formats. To label text boxes in the P&ID, the labeling application executes an OCR algorithm to predict a bounding box around, and machine-readable text within, each text box, and displays these predictions in its user interface. The labeling application provides functionality to receive a user confirmation or correction for each predicted bounding box and predicted machine-readable text. To label symbols in the P&ID, the labeling application receives user input to draw bounding boxes around symbols and assign symbols to classes of equipment. Where there are multiple occurrences of specific symbols, the labeling application provides functionality to duplicate and automatically detect and assign bounding boxes and classes. To label connections in the P&ID, the labeling application receives user input to define connection points at corresponding symbols and creates connections between the connection points.

18 Claims, 19 Drawing Sheets

(51) Int. Cl.
  *G06V 10/40* (2022.01)
  *G06F 3/0481* (2022.01)
  *G06T 11/00* (2006.01)
  *G06V 10/70* (2022.01)
  *G06V 30/10* (2022.01)
  *G06V 30/12* (2022.01)

(52) U.S. Cl.
  CPC .............. *G06T 11/00* (2013.01); *G06V 10/40* (2022.01); *G06V 10/70* (2022.01); *G06F 2203/04806* (2013.01); *G06T 2200/24* (2013.01); *G06T 2210/12* (2013.01); *G06V 30/10* (2022.01); *G06V 30/127* (2022.01)

(58) Field of Classification Search
  CPC . G06T 11/00; G06T 2200/24; G06T 2210/12; G06V 10/40; G06V 10/70; G06V 30/10; G06V 30/127; G06V 30/19167; G06V 30/422
  See application file for complete search history.

(56) References Cited

U.S. PATENT DOCUMENTS

| | | | |
|---|---|---|---|
| 9,811,251 B2 | 11/2017 | Kling et al. | |
| 2003/0130992 A1* | 7/2003 | Tyan | G06V 30/422 707/E17.022 |
| 2005/0155030 A1* | 7/2005 | DeWitt | G06F 9/30181 712/E9.035 |
| 2014/0009612 A1* | 1/2014 | King | G06V 10/17 348/143 |
| 2014/0336992 A1 | 11/2014 | Kling et al. | |
| 2016/0161930 A1 | 6/2016 | Jirkovsky et al. | |
| 2017/0061031 A1 | 3/2017 | Jammikunta et al. | |
| 2018/0114101 A1 | 4/2018 | Desai et al. | |
| 2019/0012424 A1* | 1/2019 | Brookshire | H05K 3/0005 |
| 2020/0175211 A1* | 6/2020 | Kang | G06V 30/422 |
| 2021/0096523 A1* | 4/2021 | Stump | G05B 19/0426 |
| 2021/0278960 A1* | 9/2021 | Mabote | G06F 3/0481 |
| 2021/0279271 A1* | 9/2021 | Khanafer | G06T 7/162 |

OTHER PUBLICATIONS

U.S. Patent Application by Marc-André Gardner, et al. for Techniques for Extracting Machine-Readable Information From P&IDS, pp. 1-29.

Bunke, Horst, "Automatic Interpretation of Lines and Text in Circuit Diagrams," J. Kittler, K. S. Fu, and L. F. Pau (editors), D. Reidel Publishing Company, Pattern Recognition Theory and Applications, 1982, pp. 297-310.

Duda, Richard O., et al., "Use of the Hough Transformation to Detect Lines and Curves in Pictures," Association of Computing Machinery, Inc., Graphics and Image Processing, Communications of the ACM, vol. 15, No. 1, Jan. 1972, pp. 11-15.

Moon, Yoochan, et al., "Deep Learning-Based Method to Recognize Line Objects and Flow Arrows from Image-Format Piping and Instrumentation Diagrams for Digitization," MDPI, Applied Sciences, vol. 11, No. 10054, Oct. 27, 2021, pp. 1-21.

Moreno-García, et al., "New Trends on Digitisation of Complex Engineering Drawings," Springer, Neural Computing and Applications, vol. 31, Jun. 13, 2018, pp. 1695-1712.

Paliwal, Shubham, et al., "Digitize-PID: Automatic Digitization of Piping and Instrumentation Diagrams," arXiv, arXiv: 2109.03794v1 [cs.CV], Sep. 8, 2021, pp. 1-13.

U.S. Appl. No. 17/877,560, filed Jul. 29, 2022 by Marc-André Lapointe, et al. for Techniques for Extracting Links and Connectivity From Schematic Diagrams, pp. 1-37.

Yu, Eun-seop, et al., "Features Recognition from Piping and Instrumentation Diagrams in Image Format Using a Deep Learning Network," MDPI, Engines, vol. 12, No. 4425, Nov. 21, 2019, pp. 1-19.

Zhou, Xingyi, et al., "Objects as Points," arXiv, arXiv: 1904.07850v2 [cs.CV], Apr. 25, 2019, pp. 1-12.

"European Search Report and Written Opinion," European Application No. 21 150 316.4-1207, Applicant: Bentley Systems, Incorporated, dated Jun. 8, 2021, pp. 1-10.

"European Search Report and Written Opinion," European Application No. 21 150 319.8-1207, Applicant: Bentley Systems, Incorporated, dated Jun. 9, 2021, pp. 1-8.

Julca-Aguilar, Frank D., et al., "Symbol Detection in Online Handwritten Graphics Using Faster R-CNN," IEEE, 2018 13th IAPR International Workshop on Document Analysis Systems, Apr. 24, 2018, pp. 151-156.

Mani, Shouvik, et al., "Automatic Digitization of Engineering Diagrams using Deep Learning and Graph Search," IEEE, 2020 IEEE/CVF Conference on Computer Vision and Pattern Recognition Workshops (CVPRW), Jun. 14, 2020, pp. 673-679.

Rezvanifar, Alireza, et al., "Symbol Spotting on Digital Architectural Floor Plans Using a Deep Learning-Based Framework," IEEE, 2020 IEEE/CVF Conference on Computer Vision and Pattern Recognition Workshops (CVPRW), Jun. 14, 2020, pp. 2419-2428.

* cited by examiner

TECHNIQUES FOR LABELING, REVIEWING AND CORRECTING LABEL PREDICTIONS FOR PANDIDS

RELATED APPLICATIONS

This Application claims the benefit of U.S. Provisional Patent Application No. 63/060,862 by Karl-Alexandre Jahjah et al., filed on Aug. 4, 2020 and titled "Techniques for Labeling, Reviewing and Correcting Label Predictions for P&IDs", the content of which are incorporated by reference herein in their entirety.

BACKGROUND

Technical Field

The present disclosure relates generally to the use of piping and instrumentation drawings (P&IDs) in plant and infrastructure projects, and more specifically to techniques for labeling, reviewing and correcting predictions for P&IDs in image-only formats.

Background Information

A number of engineering fields utilize functional drawings. In contrast to a physical models that represent the specific location, size and shape of elements, a functional drawing is independent of location, size and shape, focusing instead on process flow. In the field of plant and infrastructure design and maintenance, a common type of functional drawing is a P&ID. FIG. 1 is a view of a portion of an example P&ID 100. The P&ID includes symbols 110 which represent elements (e.g., valves, pumps, vessels, instruments, etc.), text boxes 120 which provide descriptions of the elements (e.g., names, codes, properties, etc.), connections 130 that represent connections between elements (e.g., pipes, electrical wires, etc.), as well as other information (e.g., title blocks, legends, notes, etc.) (not shown).

A typical plant or infrastructure project may have hundreds of related P&IDs that have been created over the course of many years. These P&IDs often may be available in an image-only format (e.g., as a graphics file such as a JPG or PNG, or as an image-only PDF, etc.) that lacks machine-readable information (e.g., metadata) about the symbols, text boxes and connections represented therein. Sometimes the image-only P&ID originated from a scan of a printed document and is of poor quality, having low resolution, visual artifacts, obscured or blurry portions and the like.

In an image-only format, information in a P&ID is hard to validate and difficult to consume. There is an increasing desire to create digital twins of plants and infrastructure, and the information in P&IDs is often useful in creating such models. However, as the information in an image-only format is largely inaccessible to design and modeling applications, obtaining such information has often involved lengthy manual review and data entry. Even updating a P&ID itself is difficult with an image-only format. Often, to make a change the entire P&ID needs to be manually recreated to represent the information in a more easily editable machine-readable form.

One possible approach to address the problem of P&IDs in image-only formats is to use machine learning to automatically extract information from the P&ID and to store it in a machine-readable form. However, deployment of a machine learning algorithm for P&ID data extraction presents ancillary technical challenges. Typically, machine learning requires large amounts of annotated data from which the artificial intelligence can infer a machine learning model. For P&ID data extraction, this annotated data may take the form of labeled example P&IDs that include depictions (e.g., raster images) of text boxes, symbols, connections, etc. and corresponding machine-readable labels. However, such labeled example P&IDs rarely already exist, and creating them specifically for the purpose of training a machine learning algorithm using existing software applications and workflows is an arduous task. A typical P&ID may include thousands of text boxes, symbols and connections. However, existing software applications and workflows typically lack any significant automation or support for increasing efficiency of repetitive tasks. While they may be workable when there are only dozens of elements, when the number of elements scales into the thousands they prove impractical.

A similar technical challenge is confronted in dealing with the output of a machine learning algorithm for P&ID data extraction. The output may take the form of a labeled P&ID, in which the machine learning algorithm has correctly predicted the majority of labels, but there are a few errors. It may be desirable to have a user review the predicted labels and correct errors. However, using existing software applications and workflows this is an arduous task. Similar to in creating a labeled data set for training, the lack of any significant automation or support for increasing efficiency of repetitive tasks hinders review and correction of predicted labels, making the workflow impractical.

Accordingly, there is a need for improved techniques for labeling, reviewing and correcting predictions for P&IDs in image-only formats.

SUMMARY

In example embodiments, techniques are provided for efficiently labeling, reviewing and correcting predictions for P&IDs in image-only formats (e.g. JPG, PNG, image-only PDF, etc.). A labeling application loads the image-only P&ID and pre-processes it to rasterize, resize and/or color-separate the P&ID. To label text boxes in the P&ID, the labeling application executes an OCR algorithm to predict a bounding box around, and machine-readable text within, each text box, and displays these predictions in its user interface. The labeling application provides functionality to receive a user confirmation or correction for each predicted bounding box and predicted machine-readable text. To label symbols in the P&ID, the labeling application receives user input to draw bounding boxes around symbols and assign symbols to classes of equipment. Where there are multiple occurrences of specific symbols, the labeling application provides functionality to duplicate and automatically detect and assign bounding boxes and classes. In duplication, the labeling application duplicates the bounding box around a given symbol to be around another symbol and copies the class to be assigned to the other symbol. In automatic detection and assignment, the labeling application automatically detects other identical symbols that correspond to a given symbol, places bounding boxes around them, and automatically assigns them the same class as the given symbol. To label connections in the P&ID, the labeling application receives user input to define connection points at corresponding symbols and creates connections between the connection points.

A variety of additional features may be implemented by the labeling application in addition to those discussed in this Summary to provide automation, increase workflow efficiency, or provide other benefits. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
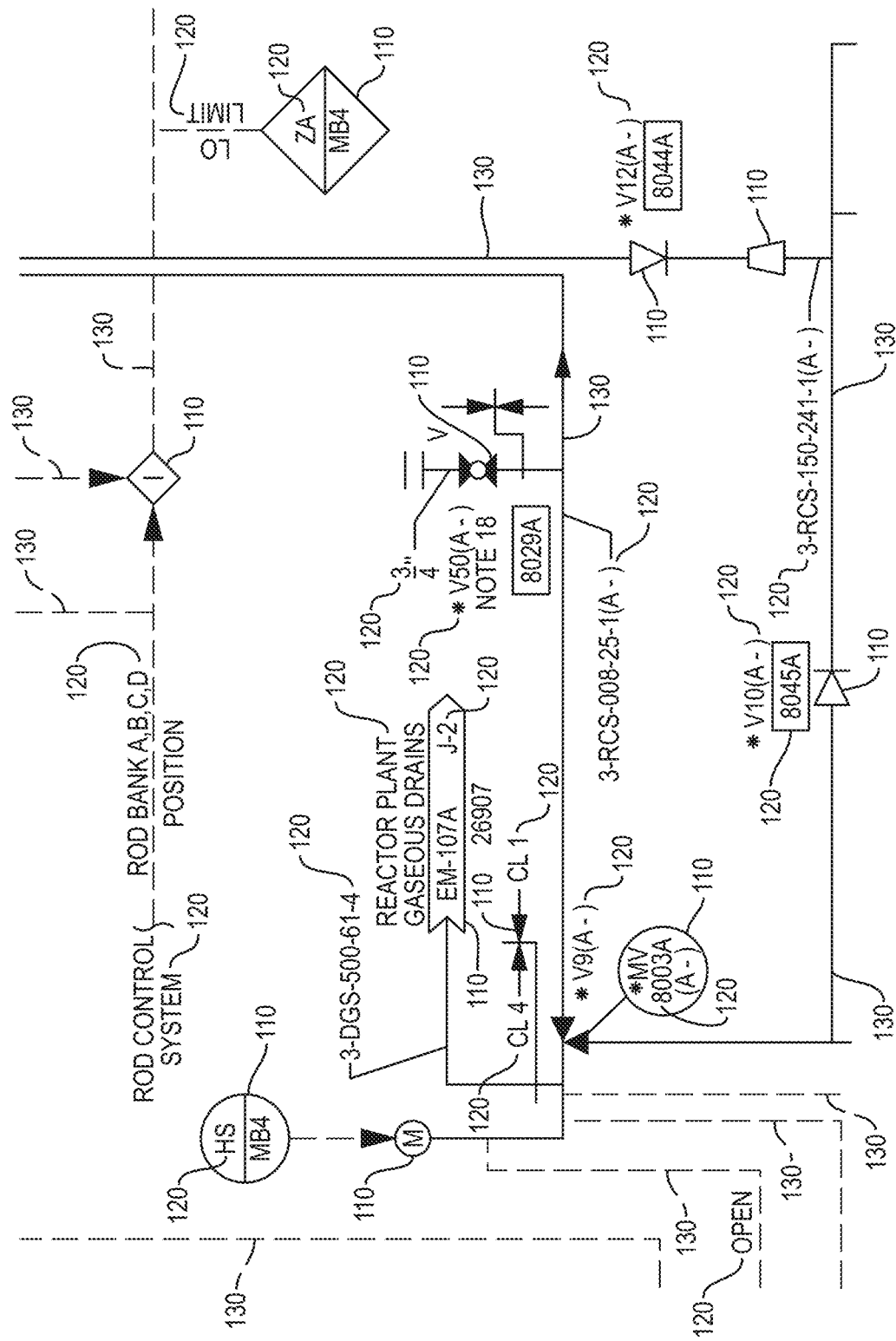
FIG. 1 is a view of a portion of an example P&ID.
Figure 2:
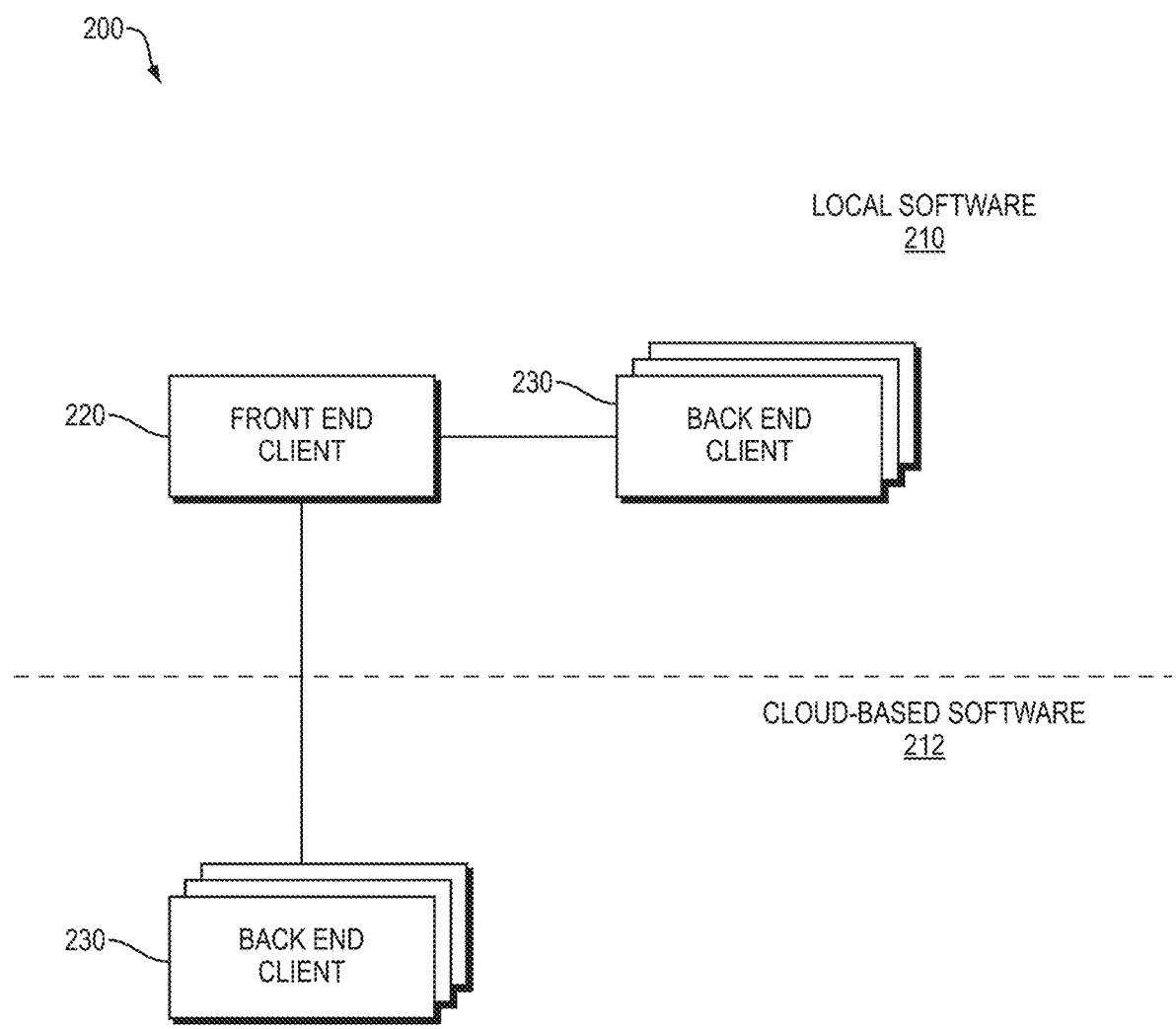
FIG. 2 is a high-level block diagram of an example labeling application that may be used to label, review labels and correct predictions for P&IDs in image-only formats (e.g. JPG, PNG, image-only PDF, etc.)

FIG. 2 is a high-level block diagram of an example labeling application 200 that may be used to label, review labels and correct predictions for P&IDs in image-only formats (e.g. JPG, PNG, image-only PDF, etc.). The labeling application 200 may be a stand-alone software application or a component of a larger software application, for example, a design and modeling software application. The software may be divided into local software 210 that executes on one or more computing devices local to an end-user (collectively "local devices") and, in some cases, cloud-based software 212 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 210 may include a frontend client 220 and one or more backend clients 230 operating on a local device. The cloud-based software 212 may include, in some cases, one or more backend clients 230 operating on cloud computing devices. The frontend client 220 may provide user interface functionality as well as perform certain non-processing intensive operations related to assigning machine-readable labels to P&IDs in image-only formats, and in some cases reviewing predicted machine readable labels for the P&IDs in image-only formats and correcting the predicted machine readable labels. The predicted machine readable labels may be provided by a machine learning algorithm of a P&ID data extraction application (not shown). The P&ID data extraction application may be separate software or another component of the same larger software application the labeling application 200 is a part of. The backend client(s) 230 may perform certain more processing intensive operations (e.g., optical character recognition (OCR) operations) related to assigning machine-readable labels to P&IDs in image-only formats and correcting predicted machine readable labels. The front-end client 220 and backend client(s) 230 may operate concurrently on different tasks, such that a user may utilize the user interface of the labeling application 200 to perform tasks while one or more backend clients 230 are performing different tasks, and without waiting for their completion.

Figure 3A:
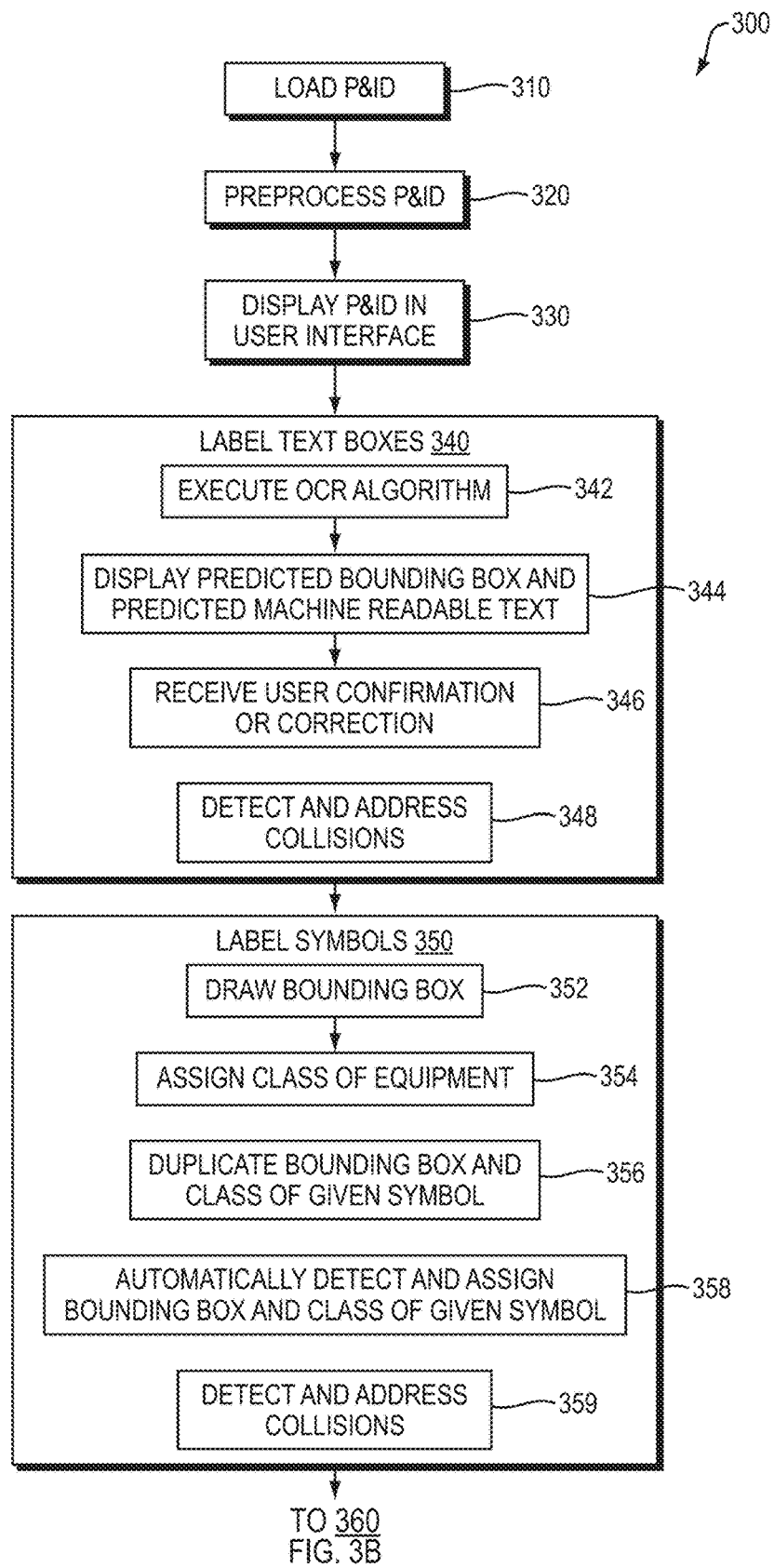
FIGS. 3A-3B are a high level sequence of steps for assigning machine-readable labels to a P&ID in an image-only format.
Figure 3B:
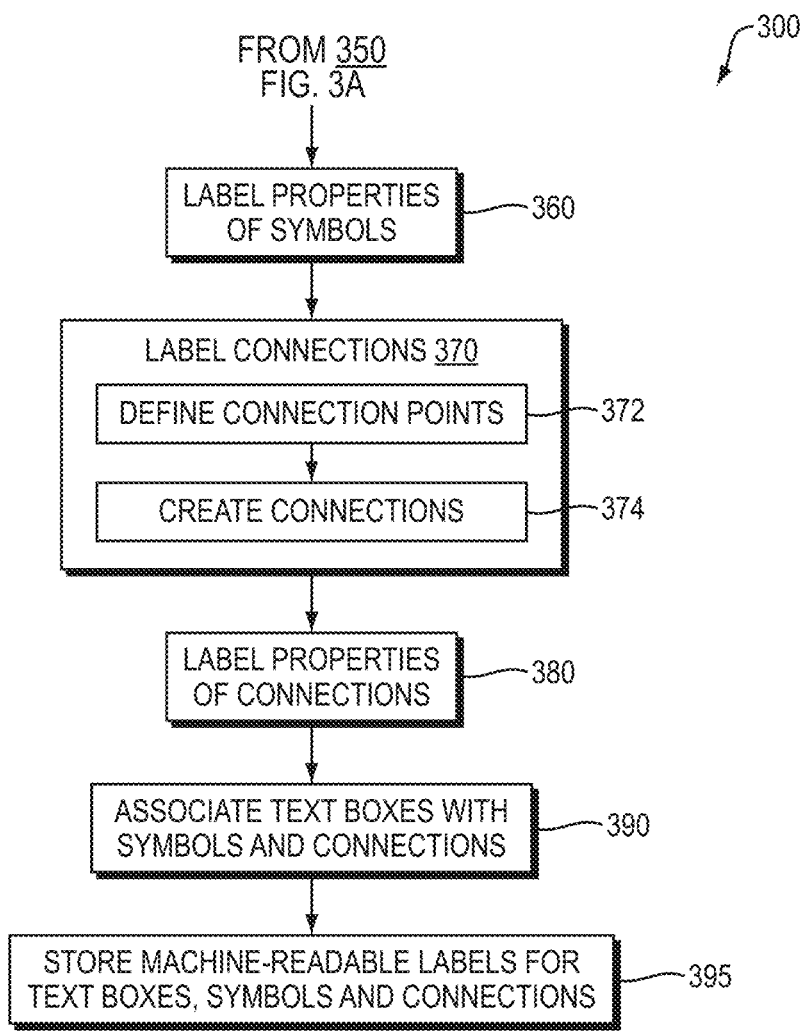

FIGS. 3A-3B are a high level sequence of steps 300 for assigning machine-readable labels to a P&ID in an image-only format. Such steps may be performed as part of generating a labeled dataset used as input for training a machine learning algorithm of a P&ID data extraction application. In such case, there may be no existing machine-readable labels for text boxes, symbols and connections in the P&ID when the steps 300 are initially performed. Alternatively, at least some of the steps 300 may be performed as part of correcting errors to predicted labels output by the machine learning algorithm of the P&ID data extraction application. In such case, there may be existing predicted machine-readable labels for at least some text boxes, symbols and connections in the P&ID when the steps are performed, and the steps may be used to correct such predictions by assigning corrected labels.

At step 310, the labeling application 200 loads a P&ID in image-only format (e.g. JPG, PNG, image-only PDF, etc.) that lacks machine-readable information (e.g., metadata) describing the text boxes, symbols, connections, etc. In some cases the P&ID originated from a scan of a printed document.

At step 320, the labeling application 200 preprocess the P&ID to rasterize, resize and/or color-separate the P&ID. Rasterization may involve decompression, conversion, and/or extraction operations to produce a rasterized P&ID. Resizing may involve changing resolution (e.g., dots-perinch (DPI) to a resolution more easily displayed and/or processed (e.g., by an OCR algorithm). Color-separating may involve separating color channels to facilitate easier processing (e.g., text of different colors may overlap, which if not separated may confuse an OCR algorithm).

Figure 4:
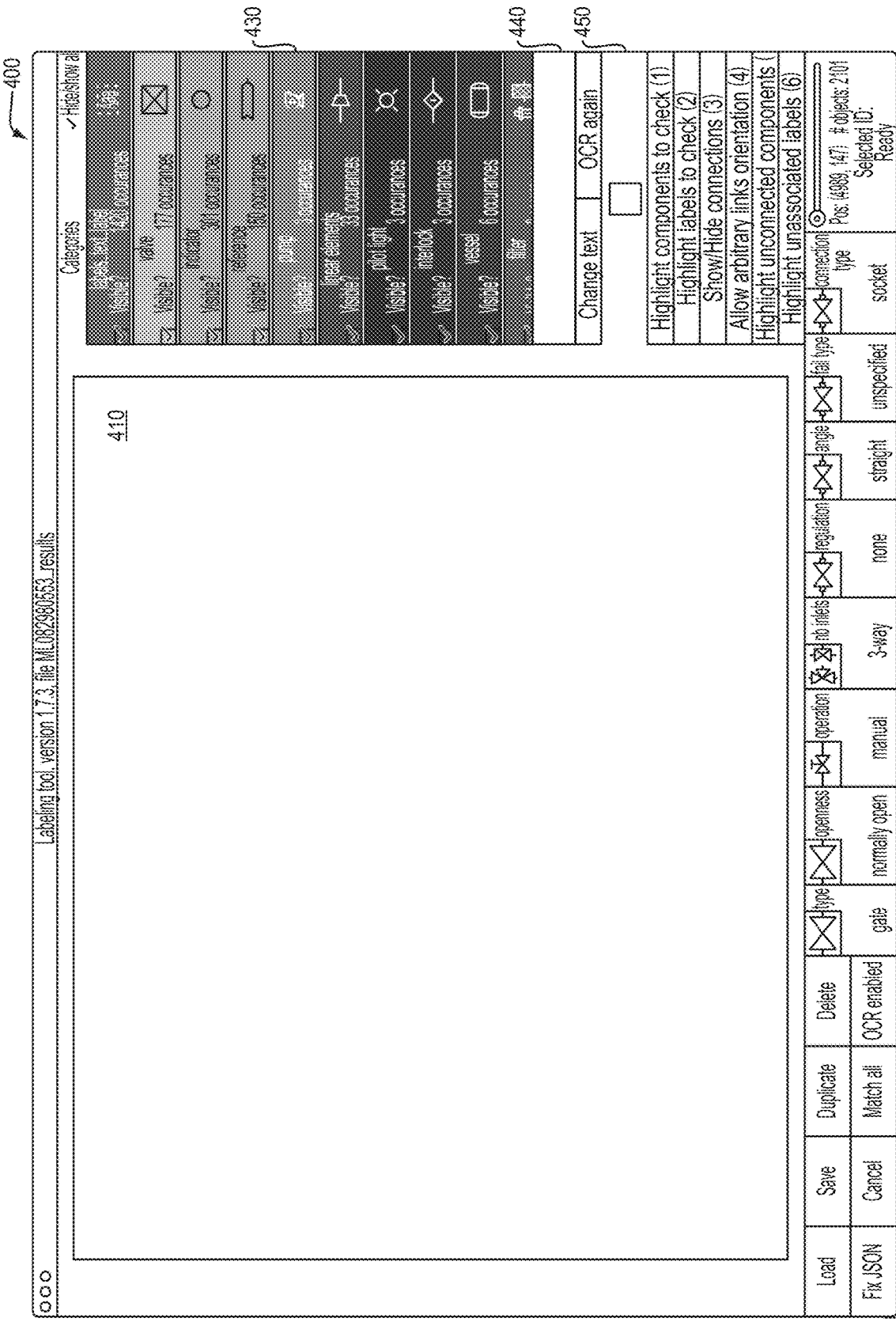
FIG. 4 is a screen shot of the user interface of an example labeling application showing a rasterized P&ID in a main window.

At step 330, the labeling application 200 displays the rasterized (and resized and color-separated) P&ID within a main window of its user interface. FIG. 4 is a screen shot 400 of the user interface of an example labeling application 200 showing a rasterized P&ID in a main window 410. The user interface further includes a command menu 420, a categories menu listing possible labels for symbols and connections 430, a text detection results box 440 for displaying predicted machine-readable text for a currently selected text box, and a zoom-in section window 450 for displaying a zoomed in view of a portion of the P&ID.

At step 340, the labeling application 200 labels text boxes in the P&ID by performing a number of sub-steps. The sub-steps may vary depending upon whether the labeling is part of generating a labeled dataset used as input for training a machine learning algorithm of a P&ID data extraction application or as part of correcting errors to predicted labels output by the machine learning algorithm of the P&ID data extraction application. Where it is part of generating a labeled dataset, at sub-step 342, the labeling application 200 executes an OCR algorithm that predicts bounding boxes that surround, and text within, each text box in the P&ID. Alternatively, where it is part of correcting errors to predicted labels, sub-step 342 may be skipped and predicted bounding boxes loaded from data (e.g., a JavaScript Object Notation (JSON) file) associated with the P&ID output from the machine learning algorithm of the P&ID data extraction application.

Figure 5:
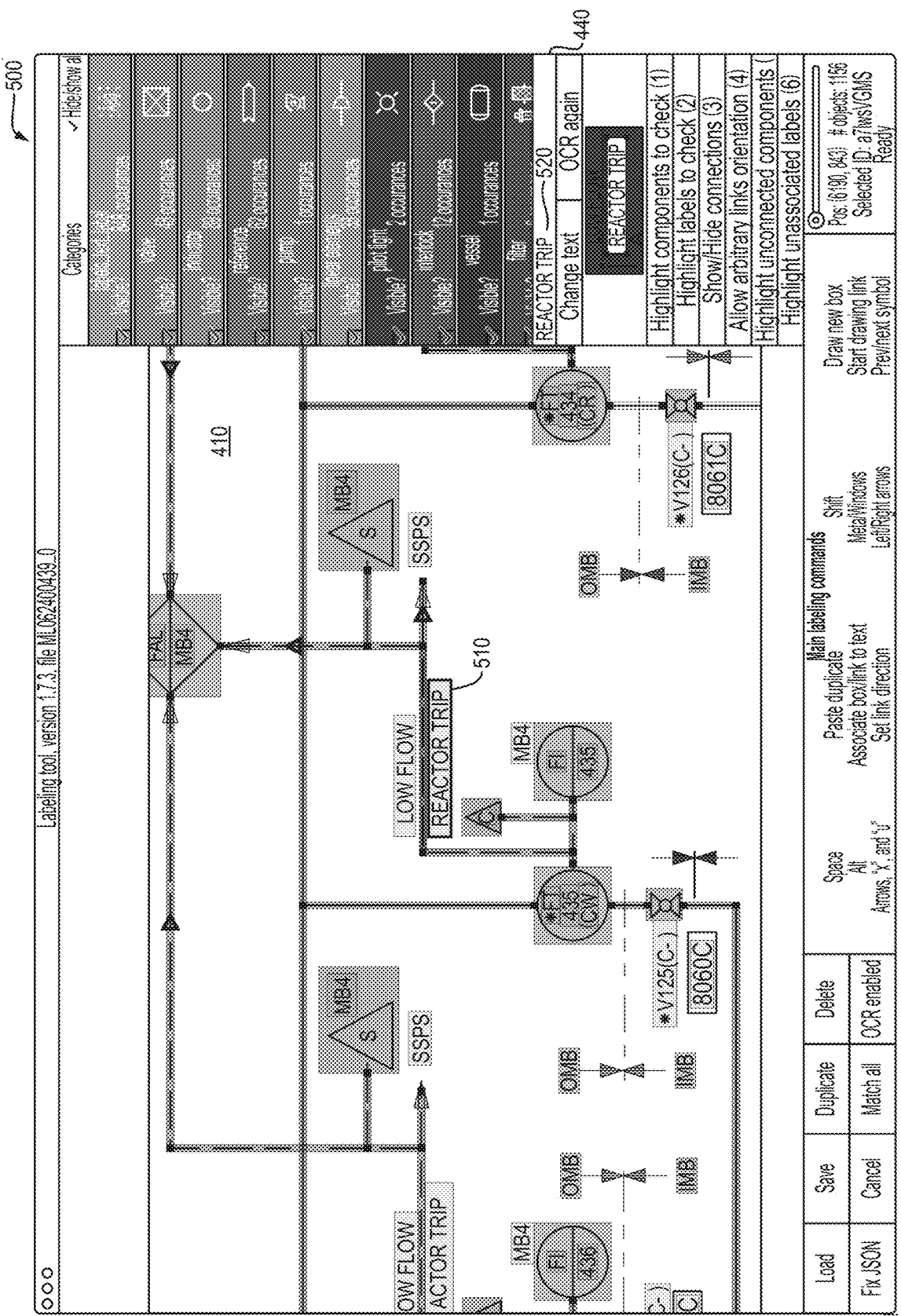
FIG. 5 is a screen shot of the user interface of an example labeling application showing a correctly predicted bounding box and correctly predicted machine-readable text for a first text box.
Figure 6:
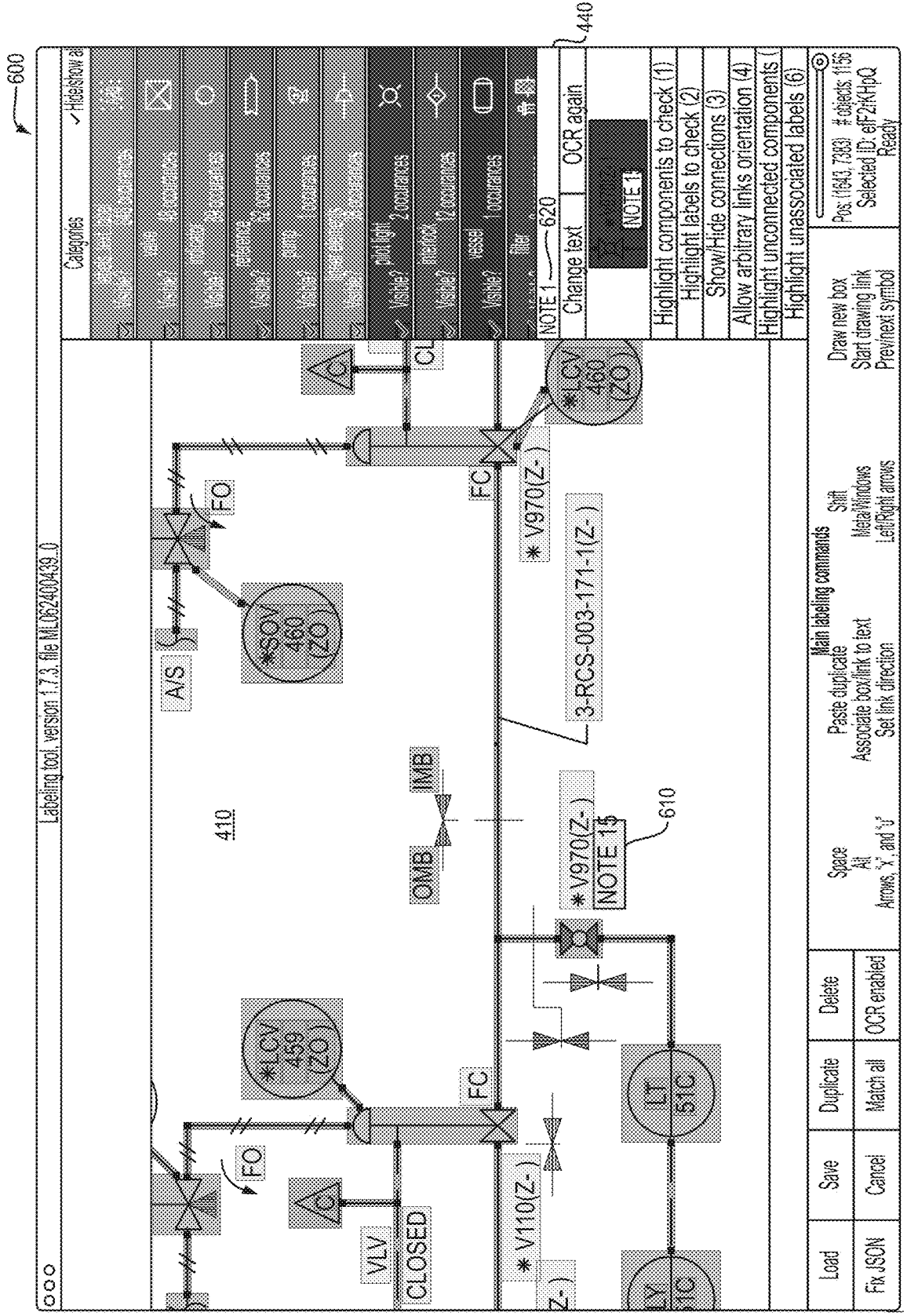
FIG. 6 is a screen shot of the user interface of an example labeling application showing an incorrectly predicted bounding box and incorrectly predicted machine-readable text for a second text box.

At sub-step 344, the labeling application 200 displays the predicted bounding box and predicted machine-readable text for each of the text boxes. The predicted bounding box (e.g., for those text boxes in view) may be shown in the main window 410, while the predicted machine-readable text (e.g., for a currently selected text box) may be shown in the detection results box 440. Some predictions may be correct while others may include errors. FIG. 5 is a screen shot 500 of the user interface of an example labeling application 200 showing a correctly predicted bounding box and correctly predicted machine-readable text for a first text box. In this example, the currently selected text box is for a reactor trip. The bounding box 510 is highlighted, while the predicted machine-readable text "REACTOR TRIP" is shown in the detection results box 440. FIG. 6 is a screen shot 600 of the user interface of an example labeling application 200 showing an incorrectly predicted bounding box and incorrectly predicted machine-readable text for a second text box. In this example, the currently selected text box is for a valve. The bounding box 610 is highlighted, while the predicted machine-readable text "NOTE 1" is shown in the detection results box 440. As can be seen, the bounding box 610 does not fully surround the text box (cutting off part of the "5"), and the predicted machine-readable text is missing a character (lacking the "5").

At sub-step 346, for each item the labeling application 200 receives either a confirmation the predicted bounding box or predicted machine-readable text is correct, or a correction to the predicted bounding box or predicted machine-readable text. Each text box may be marked with a flag until a corresponding confirmation or correction is received. To facilitate fast review, the user may be permitted to scroll through all text boxes, or only flagged text boxes, using shortcuts (e.g., arrow keys on a keyboard).

At sub-step 348, which may occur simultaneously with the other sub-steps 342-346, the labeling application 200 detect a collision of bounding boxes for text boxes when more than a predefined percentage of the area of one bounding box is contained within another bounding box, and automatically deletes a bounding box and merges the related machine-readable text into the machine-readable text of the other bounding box. Such collision detection may address OCR issues related to multiline text (which OCR algorithms tends to separate rather than group together as is generally desired) and otherwise expedite labeling.

Figure 3C:
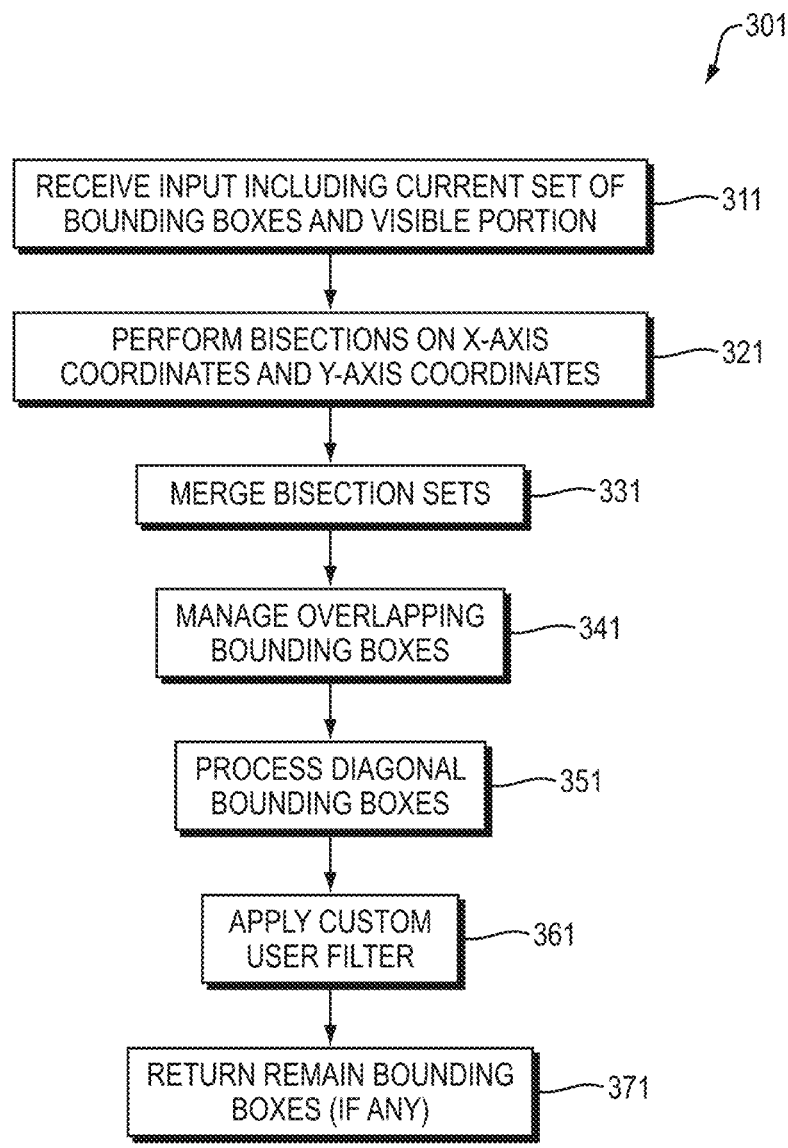
FIG. 3C is a sequence of steps for an example collision detection algorithm.

FIG. 3C is a sequence of steps 301 for an example collision detection algorithm that may be used in sub-step 348 (and also sub-step 359 discussed further below) At step 311, the collision detection algorithm receives a current set of bounding boxes for a P&ID and an indication of the visible portion of the P&ID in the main window 410 of the labeling application 200. Bounding box x-axis coordinates and y-axis coordinates may be maintained in sorted lists. At step 321, the collision detection algorithm performs bisections (e.g., left bisections) on the x-axis coordinates and y-axis coordinates to return potential candidates for collision. The x-axis and y-axis bisections may be performed in parallel to speed processing. In order to do so, the collision detection algorithm may keep an updated list of bounding boxes ordered per coordinate when any modifications are made. At step 331, the collision detection algorithm merges the bisection sets for the x-axis coordinates and y-axis coordinates and keeps only potential candidates for collision that fit both cases. To avoid unnecessary calculations, the merging may focus on the visible portion of the P&ID in the main window 410. At step 341, the collision detection algorithm manages overlapping bounding boxes. Some items may overlap (e.g., a text box inside of a symbol). In such case, the collision detection algorithm may select the bounding box for the smallest one. At step 351, diagonal bounding boxes may be specially processed. The bisections on the x-axis and y-axis coordinates in step 311 assume horizonal or vertical rectangular bounding boxes. To accommodate occasional bounding boxes arranged in diagonal directions, potential collisions therewith may be specially examined to avoid spurious collision detection. At step 361, a custom user filter may be applied to further reduce potential candidates for collision. Finally, at step 371, remaining bounding boxes (if any) are returned.

Figure 7:
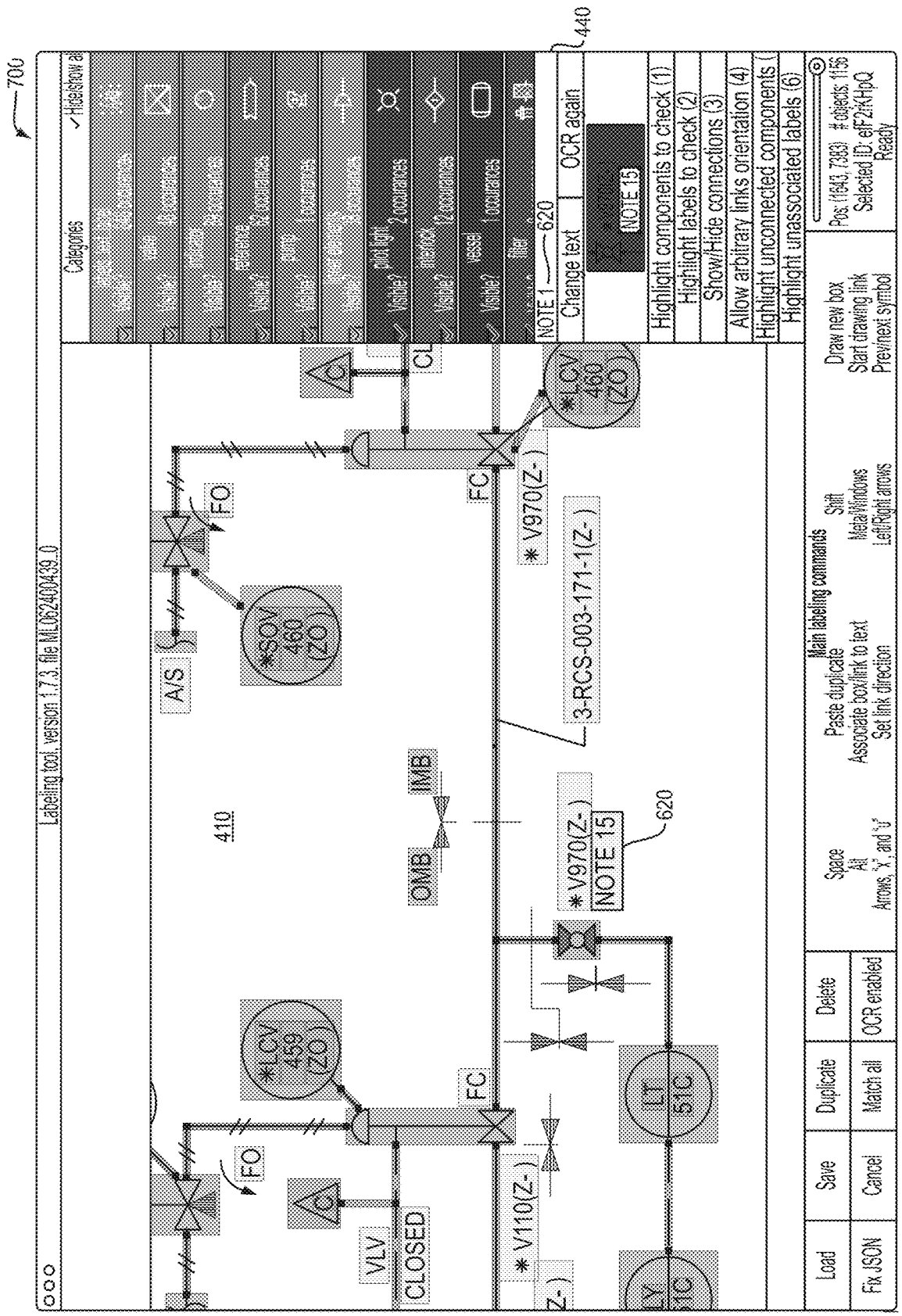
FIG. 7 is a screen shot of the user interface of an example labeling application showing a correction to an incorrectly predicted bounding box for the second text box.
Figure 8:
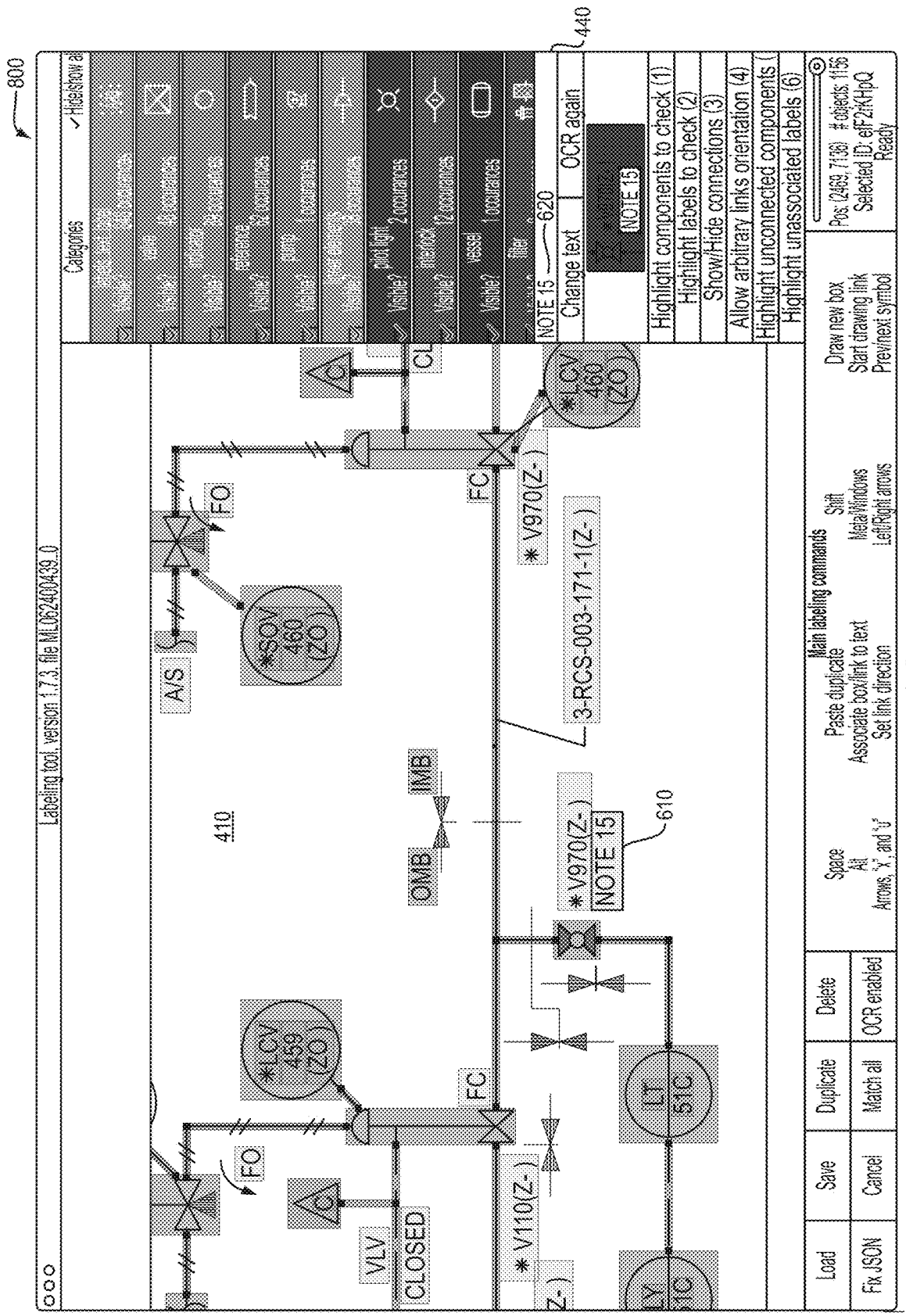
FIG. 8 is a screen shot of the user interface of an example labeling application showing a correction to incorrectly predicted machine-readable text for the second text box.

FIG. 7 is a screen shot 700 of the user interface of an example labeling application 200 showing a correction to an incorrectly predicted bounding box for the second text box. In this example, the user manipulates a pointer in the main window 410 to drag a corner of the bounding box 610 so it fully surrounds the text box (includes all of the "5"). Alternatively, the user could drag a corner in the zoom-in section window 450 to make a similar correction. FIG. 8 is a screen shot 800 of the user interface of an example labeling application 200 showing a correction to incorrectly predicted machine-readable text for the second text box. In this example, the user manipulates a text cursor in the detection results box 440 to correct the text (add the missing "5"). In some cases, the OCR algorithm (running as a background process) may detect the corrected bounding box and automatically correct the predicted machine-readable text. If such automatic correction itself does not include an error, correction in the detection results box 440 may not be needed.

Figure 9:
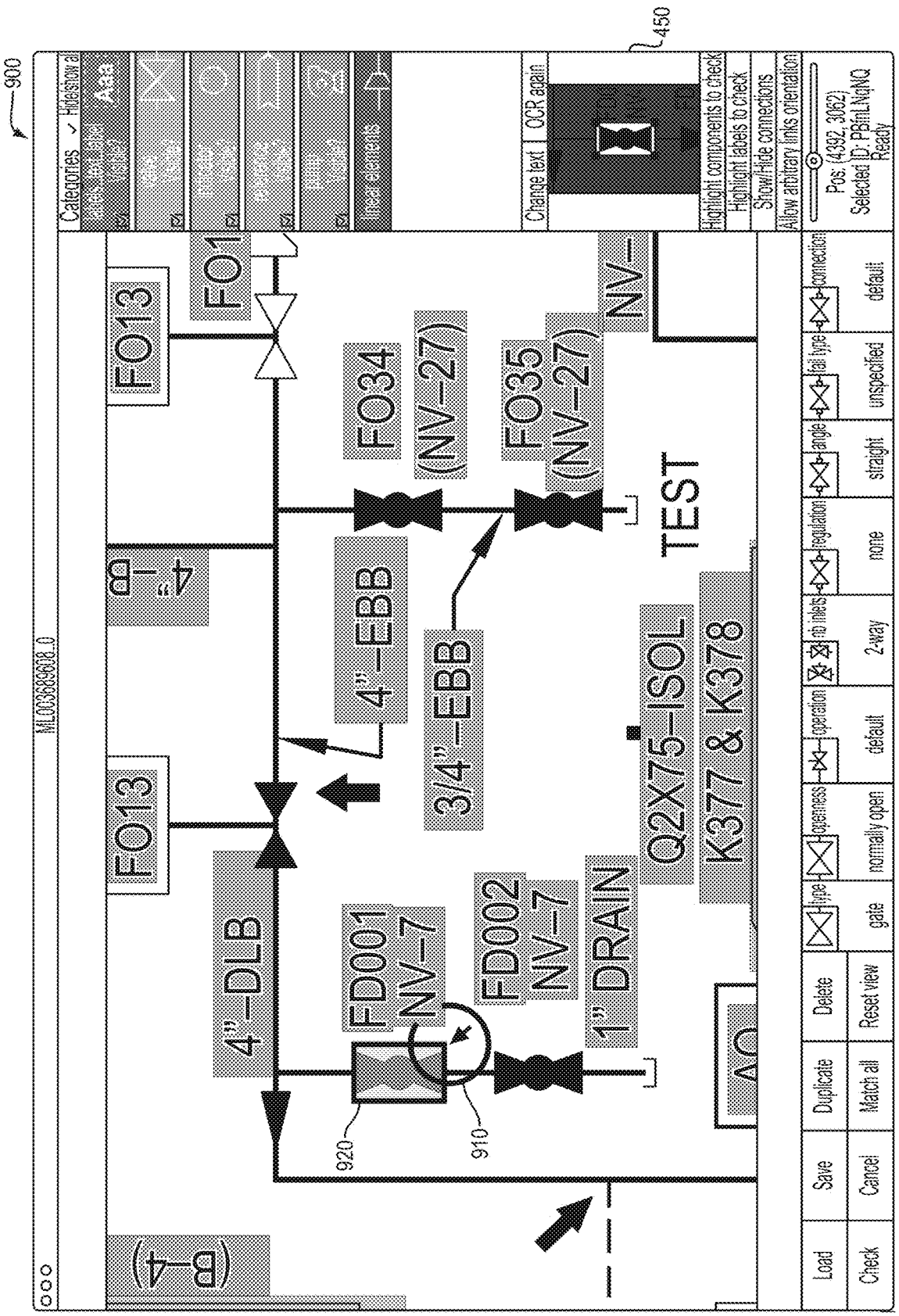
FIG. 9 is a screen shot of the user interface of an example labeling application showing drawing a bounding box for a symbol.

At step 350, the labeling application 200 labels symbols in the P&ID by performing a number of sub-steps. The sub-steps may vary depending upon whether the labeling is part of generating a labeled dataset used as input for training a machine learning algorithm of a P&ID data extraction application or as part of correcting errors to predicted labels output by the machine learning algorithm of the P&ID data extraction application. At sub-step 352, in response to user input in the user interface, the labeling application 200 draws a bounding box around the respective symbol for at least some of the symbols in the P&ID. Where sub-step 352 is performed as part of generating a labeled dataset, there may be no exiting bounding box around the symbol, and the drawing may create a new bounding box. Alternatively, where it is part of correcting errors to predicted labels, there may be an existing predicted bounding box around the symbol and the drawing may correct the predicted bounding box to change its size or shape. FIG. 9 is a screen shot 900 of the user interface of an example labeling application 200 showing drawing a bounding box for a symbol. In this example, the symbol is a valve. The user manipulates a pointer 910 in the main window 410 to drag a corner of the bounding box 920 so it surrounds the valve. Alternatively, the user could drag a corner in the zoom-in section window 450.

Figure 10:
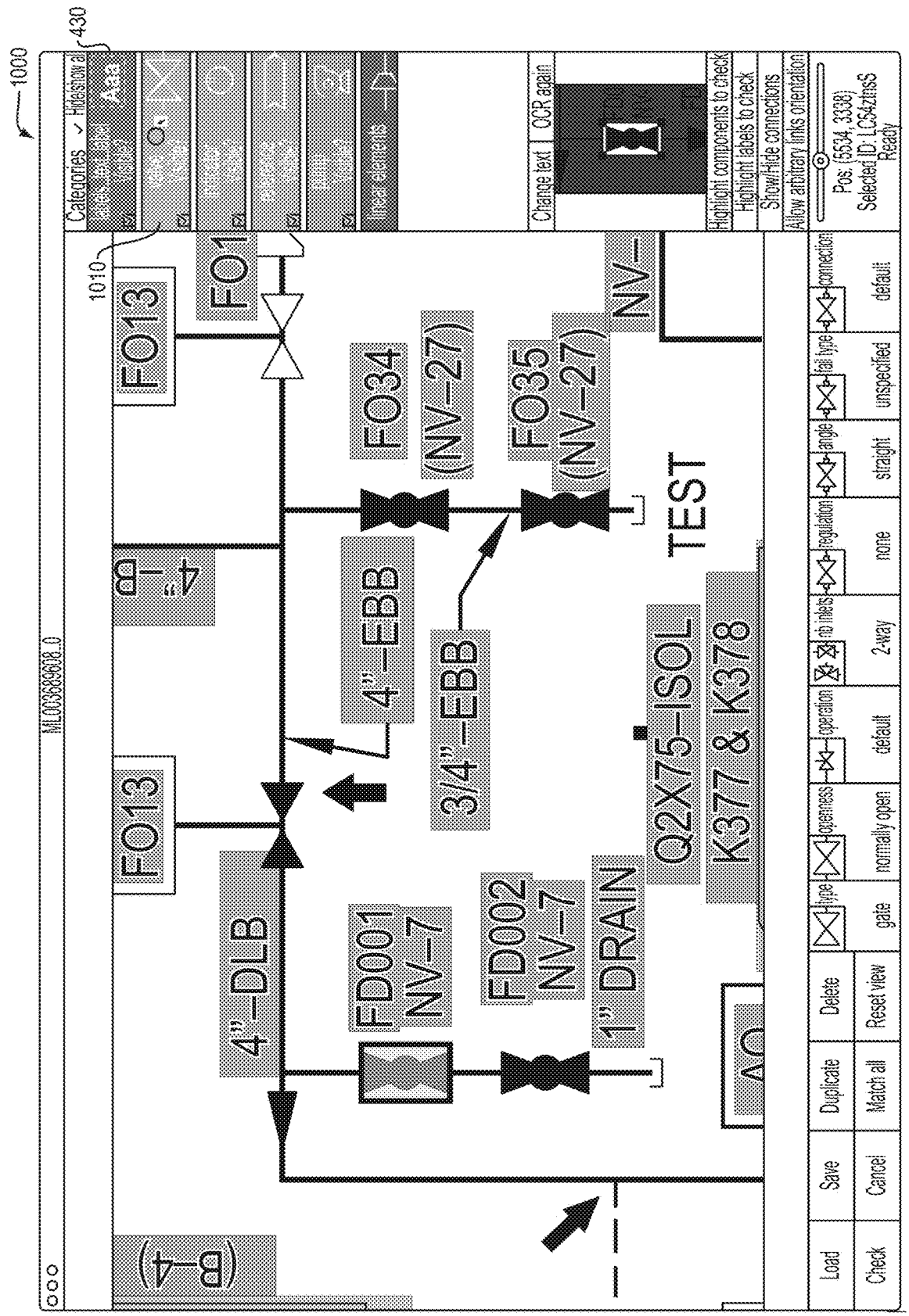
FIG. 10 is a screen shot of the user interface of an example labeling application showing selecting a class of equipment.

At sub-step 354, in response to user input in the user interface, the labeling application 200 assigns the given symbol a class of equipment. Where sub-step 354 is performed as part of generating a labeled dataset there may be no exiting class and the step may assign a class to the symbol. Alternatively, where it is part of correcting errors to predicted labels, there may be an existing predicted class and the step may correct the predicted class. FIG. 10 is a screen shot 1000 of the user interface of an example labeling application 200 showing selecting a class of equipment. In this example, the user selects the class "Valve" 1010 in the categories menu 430. The symbol is then labeled as a valve. Various user interface mechanisms may be used to facilitate efficient selection. For example, different classes of equipment may be displayed in different colors for easy identification.

Figure 11:
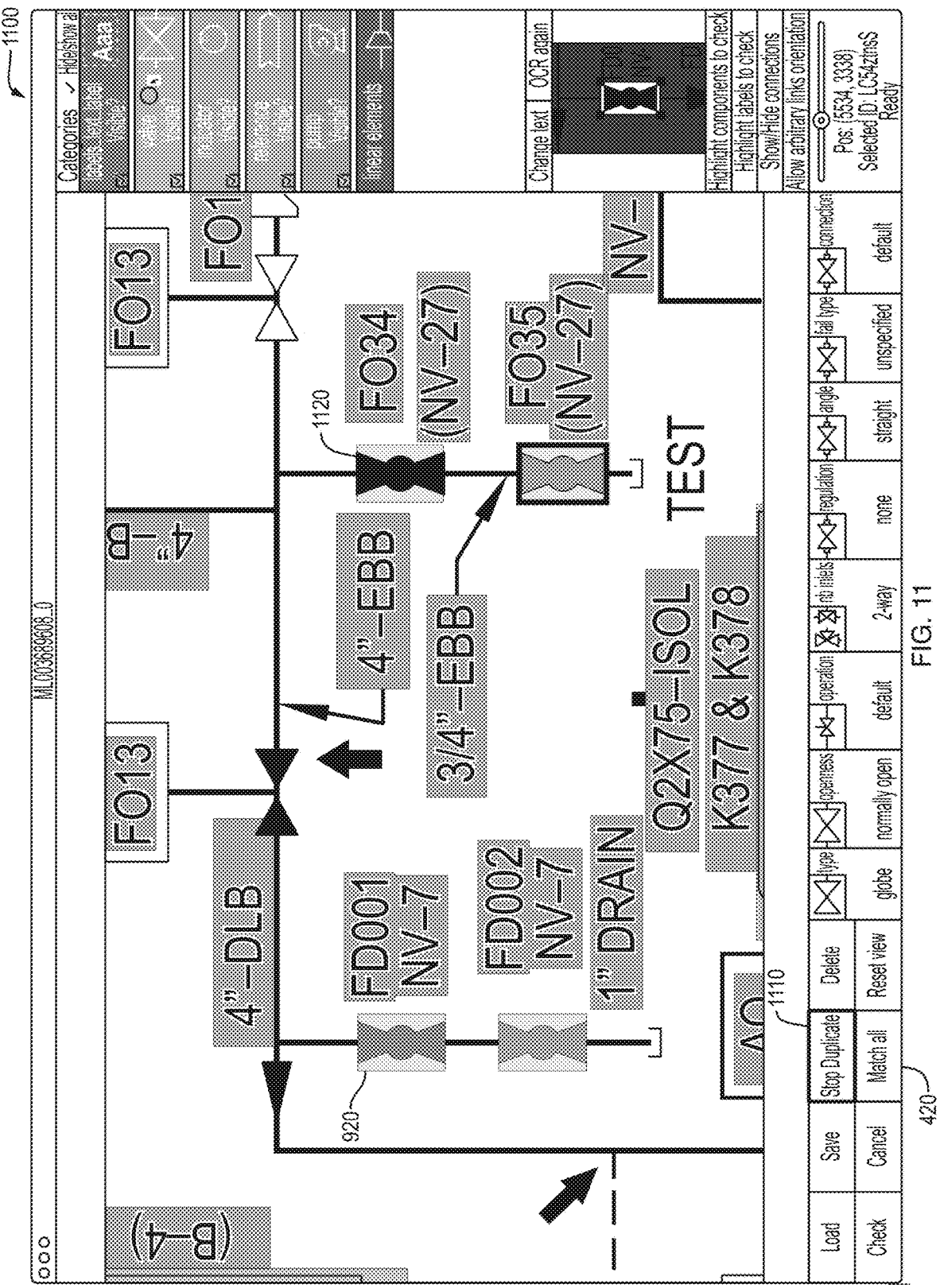
FIG. 11 is a screen shot of the user interface of an example labeling application showing duplication operations.

In many P&IDs, specific symbols occur more than once in the drawing, and individually labeling each instance of such symbols may be highly repetitive. This may occur when the labeling is part of generating a labeled dataset used as input for training a machine learning algorithm of a P&ID data extraction application or as part of correcting errors to predicted labels output by the machine learning algorithm of the P&ID data extraction application (e.g., the same correction needs to be made many times). Such repetition may be addressed in various ways. At sub-step 356, in response to user input in the user interface, the labeling application 200 duplicates the bounding box around a given symbol to be around another symbol and copies the class of equipment to be assigned to the other symbol. FIG. 11 is a screen shot 1100 of the user interface of an example labeling application 200 showing duplication operations. In this example, the user selects the bounding box 920 and class "Valve" and duplicates it (e.g., by pressing a button 1110 in the command menu 420) and dragging a representation 1120 to be disposed over each instance of the valve.

Figure 12:
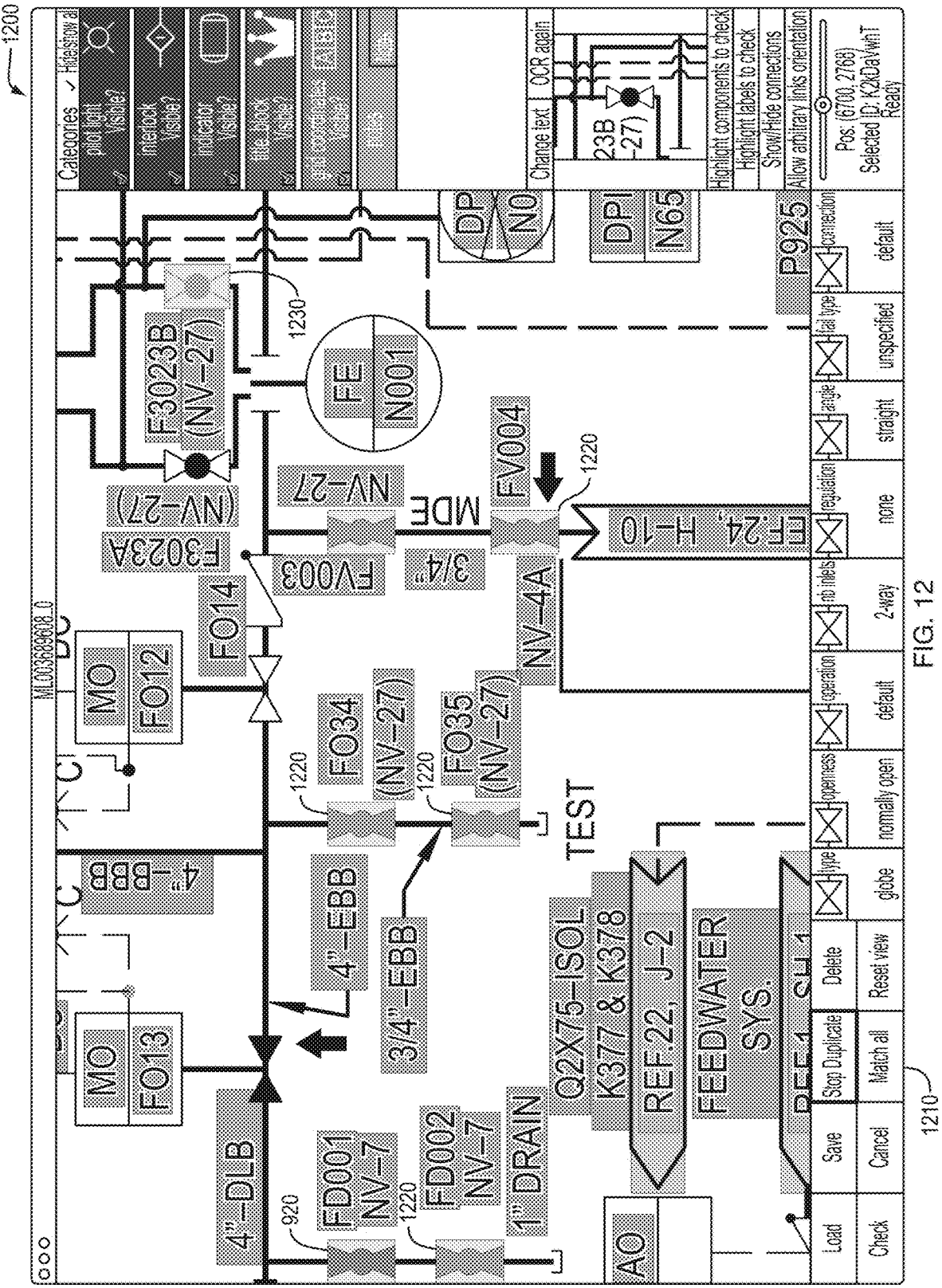
FIG. 12 is a screen shot of the user interface of an example labeling application showing automatic assignment of bounding boxes and classes to symbols.

Alternative, at sub-step 358, in response to user input in the user interface, the labeling application 200 uses an image detection algorithm to automatically detect other identical symbols in the P&ID that correspond to a given symbol, places bounding boxes around the other symbols, and automatically assigns them the same class as the given symbol. The user has to only do a quick check instead of tediously drawing bounding boxes around and selecting classes for each other symbol. The other symbols may each be marked with a flag until a corresponding confirmation or correction for the automatically placed bounding box and automatically selected class is received from the user. To facilitate fast review, the user may be permitted to scroll through flagged symbols using shortcuts (e.g., arrow keys on a keyboard). FIG. 12 is a screen shot 1200 of the user interface of an example labeling application 200 showing automatic assignment of bounding boxes and classes to symbols. In this example, the user selects the bounding box 920 and class "Valve" and triggers automatic assignment (e.g., by pressing a button 1210 in the command menu 420). The image detection algorithm of the labeling application 200 automatically detects symbols 1220, 1230, automatically draws bounding boxes around them, and assigns them the class "Valve." Some symbols 1220 are correctly detected, and may be confirmed by the user. A symbol 1230 is incorrectly detected, and may be corrected by the user.

At sub-step 359, which may occur simultaneously with the other sub-steps 352-348, the labeling application 200 detect a collision of bounding boxes for symbols when more than a predefined percentage of the area of one bounding box is contained within another bounding box, and automatically deletes a bounding box. Steps set forth above in FIG. 3C may be used to perform the collision detection for symbols. Some larger symbols may include smaller symbols. Through collision detection it may be ensured the larger symbols will be labeled with a single bounding box and class that applies to the entire symbol.

Figure 13:
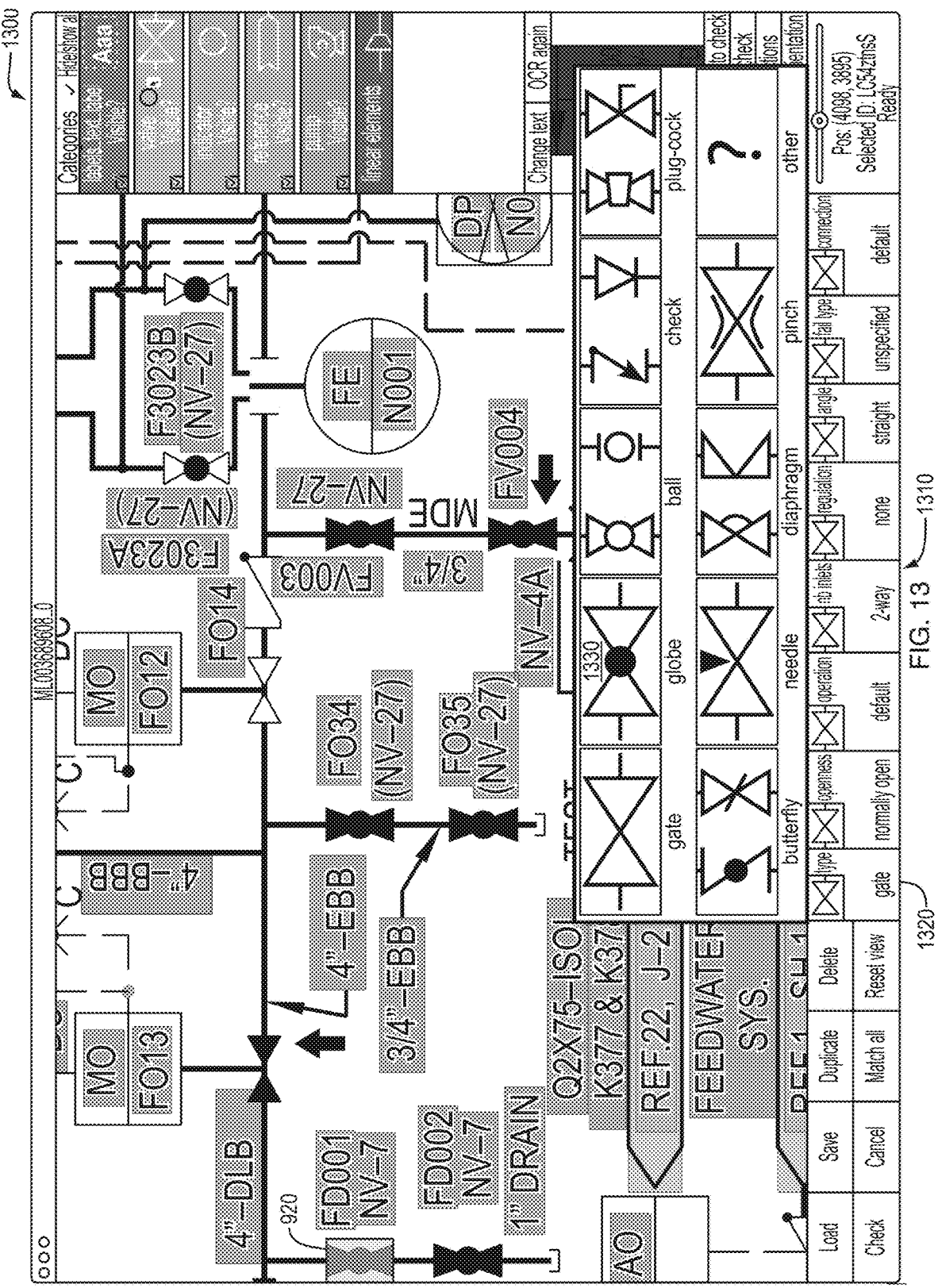
FIG. 13 is a screen shot of the user interface of an example labeling application showing labeling a first property of a symbol.
Figure 14:
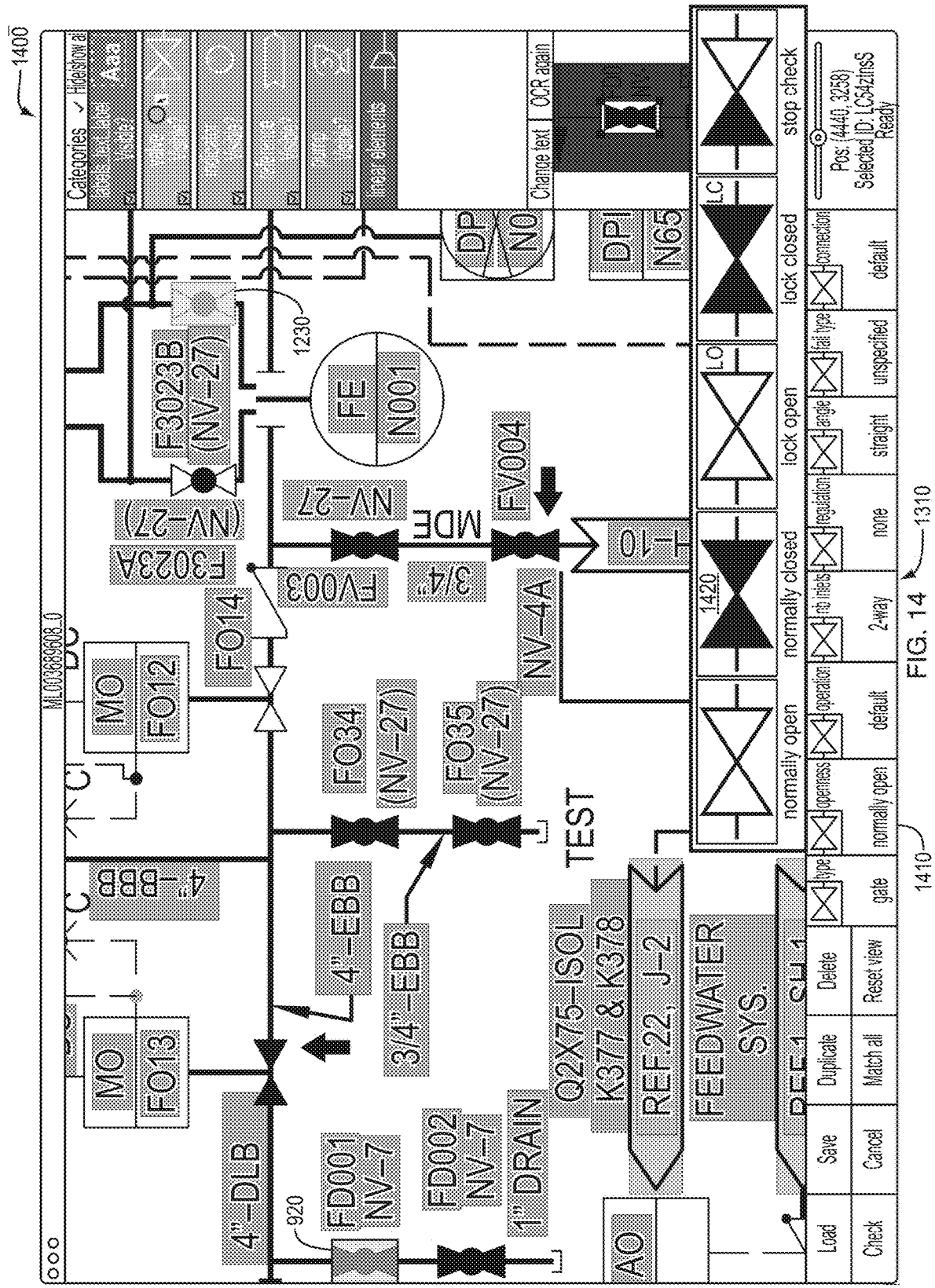
FIG. 14 is a screen shot of the user interface of an example labeling application showing labeling a second property of a symbol.

At step 360, the labeling application 200 labels properties of symbols in the P&ID. The step may vary depending upon whether the labeling is part of generating a labeled dataset used as input for training a machine learning algorithm of a P&ID data extraction application or as part of correcting errors to predicted labels output by the P&ID data extraction application. Where the step 360 is performed as part of generating a labeled dataset, there may be no exiting properties for symbols. Upon assigning a class to a symbol the user may select a value of each of a number of properties on a property list for that class. Each property may have a default value that is used if a user does not actively make a selection. Alternatively, where it is part of correcting errors to predicted labels, there may be existing predicted properties and the step may correct the predicted properties. A user selected property value of a property in the property list may override the predicted property value. FIG. 13 is a screen shot 1300 of the user interface of an example labeling application 200 showing labeling a first property of a symbol. In this example, the user selects the class "Valve" 1010 in the categories menu 430. The symbol surround by bounding box 920 is then labeled as a valve. Valves may have a number of properties, including a type property (e.g., gate, globe, ball, check, etc.) an openness property (e.g., open, locked open, normally closed, locked closed, etc.), among others. Here, the user selects the value "globe" 1330 for the type property 1320 in a property list 1310. FIG. 14 is a screen shot 1400 of the user interface of an example labeling application 200 showing labeling a second property of a symbol. In this example, the user selects the value "normally closed" 1330 for the openness property 1410 in the property list 1310.

When the labeling application 200 duplicates the bounding box and class of a given symbol for use with other symbols, or when the labeling application 200 automatically detects and applies the bounding box and class of a given symbol to other symbols, the properties of the given symbol may be duplicated or applied as well. In this manner, a user may be freed from repetitively entering properties for identical symbols in the P&ID.

Figure 15:
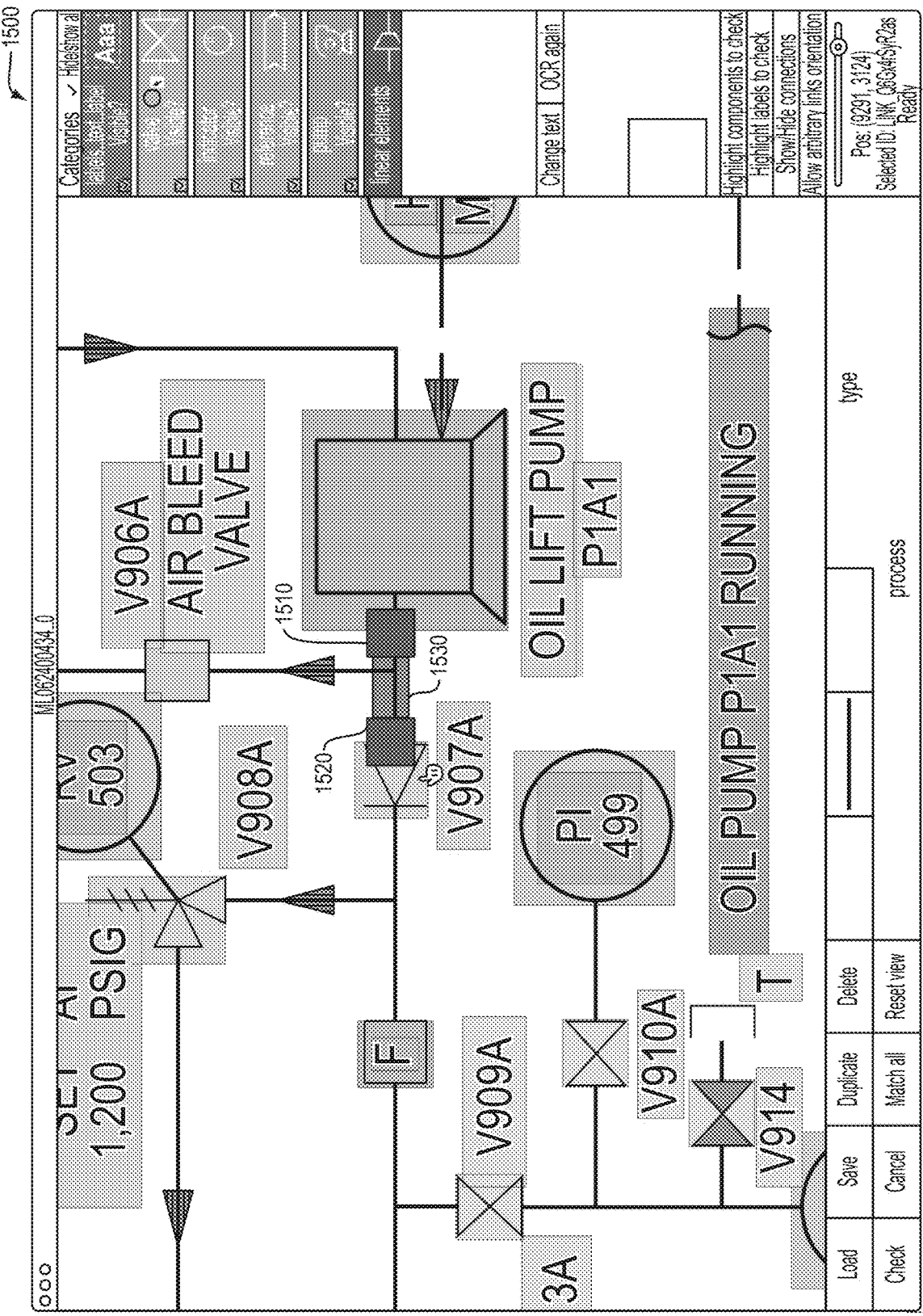
FIG. 15 is a screen shot of the user interface of an example labeling application showing defining connection points and creating connections.

At step 370, labeling application 200 labels connections in the P&ID by performing a number of sub-steps. The sub-steps may vary depending upon whether the labeling is part of generating a labeled dataset used as input for training a machine learning algorithm of a P&ID data extraction application or as part of correcting errors to predicted labels output by the machine learning algorithm of the P&ID data extraction application. At sub-step 372, in response to user input in the user interface, the labeling application 200 defines connection points at corresponding symbols. Where sub-step 372 is performed as part of generating a labeled dataset, there may be no exiting connection points and new connection points may be defined. Alternatively, where it is part of correcting errors to predicted labels, there may be existing predicted connection points, is and the defining may move the existing connection points or replace them with different connection points. The labeling application 200 may automatically adjust the position of connection points to be at the border of symbols without user input. At sub-step 374, the labeling application 200 creates a connection between the connection points. The labeling application 200 may automatically associate the connection with the symbols of each connection point. FIG. 15 is a screen shot 1500 of the user interface of an example labeling application 200 showing defining connection points and creating connections. In this example, the user has indicated two connection points 1510, 1520. In response thereto, the labeling application 200 has created a connection 1530 therebetween.

Figure 16:
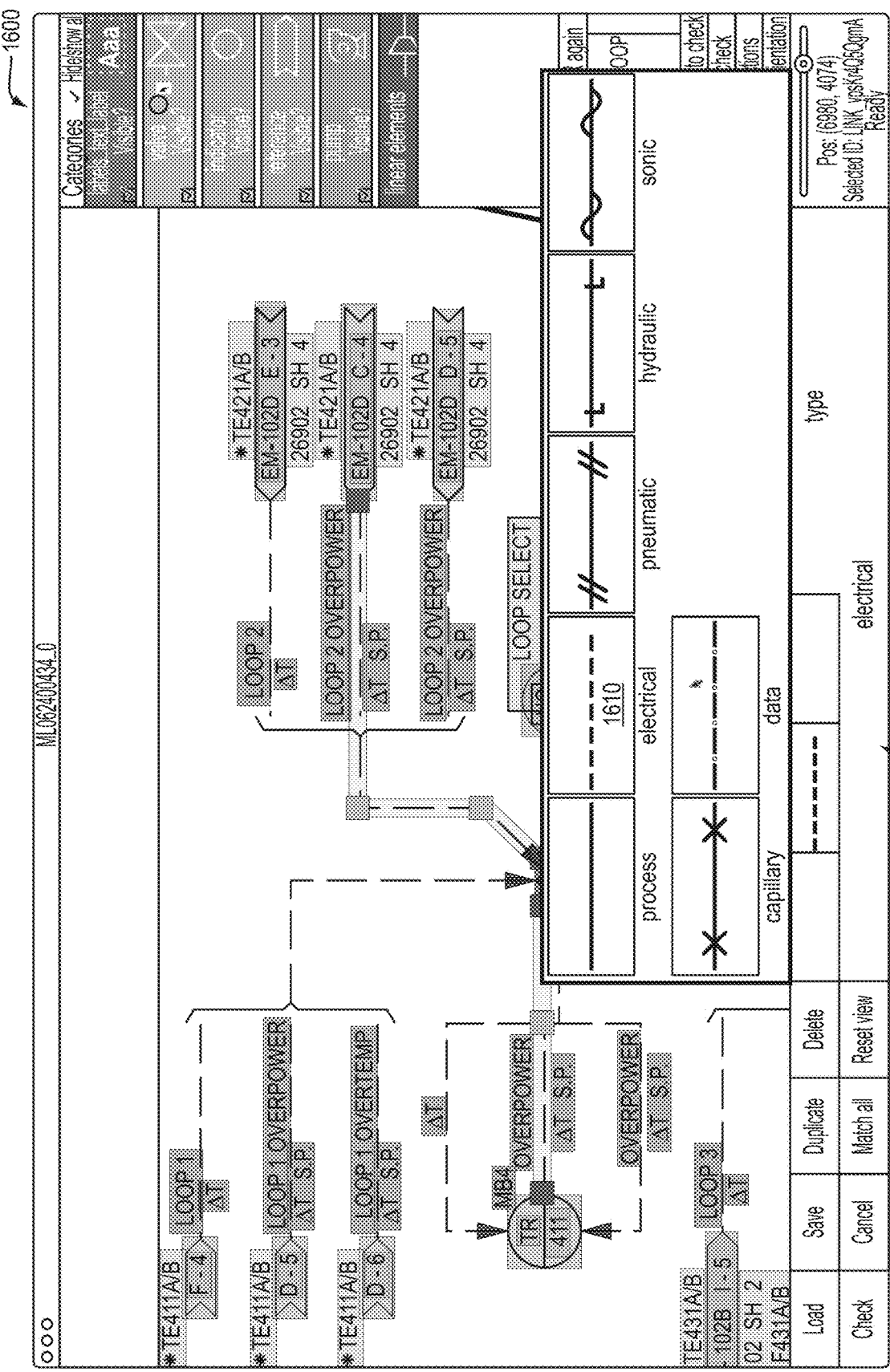
FIG. 16 is a screen shot of the user interface of an example labeling application showing labeling a property of a connection.

At step 380, the labeling application 200 labels properties of connections in the P&ID. The step may vary depending upon whether the labeling is part of generating a labeled dataset used as input for training a machine learning algorithm of a P&ID data extraction application or as part of correcting errors to predicted labels output by the machine learning algorithm of the P&ID data extraction application. Where the step 380 is performed as part of generating a labeled dataset, there may be no exiting properties for connections. Alternatively, where it is part of correcting errors to predicted labels, there may be existing predicted properties and the step may correct the predicted properties. The user may select a value of a property from a connection property list. FIG. 16 is a screen shot 1600 of the user interface of an example labeling application 200 showing labeling a property of a connection. In this example, the user has selected the value "electrical" 1610 from a connection property list 1620.

Figure 17:
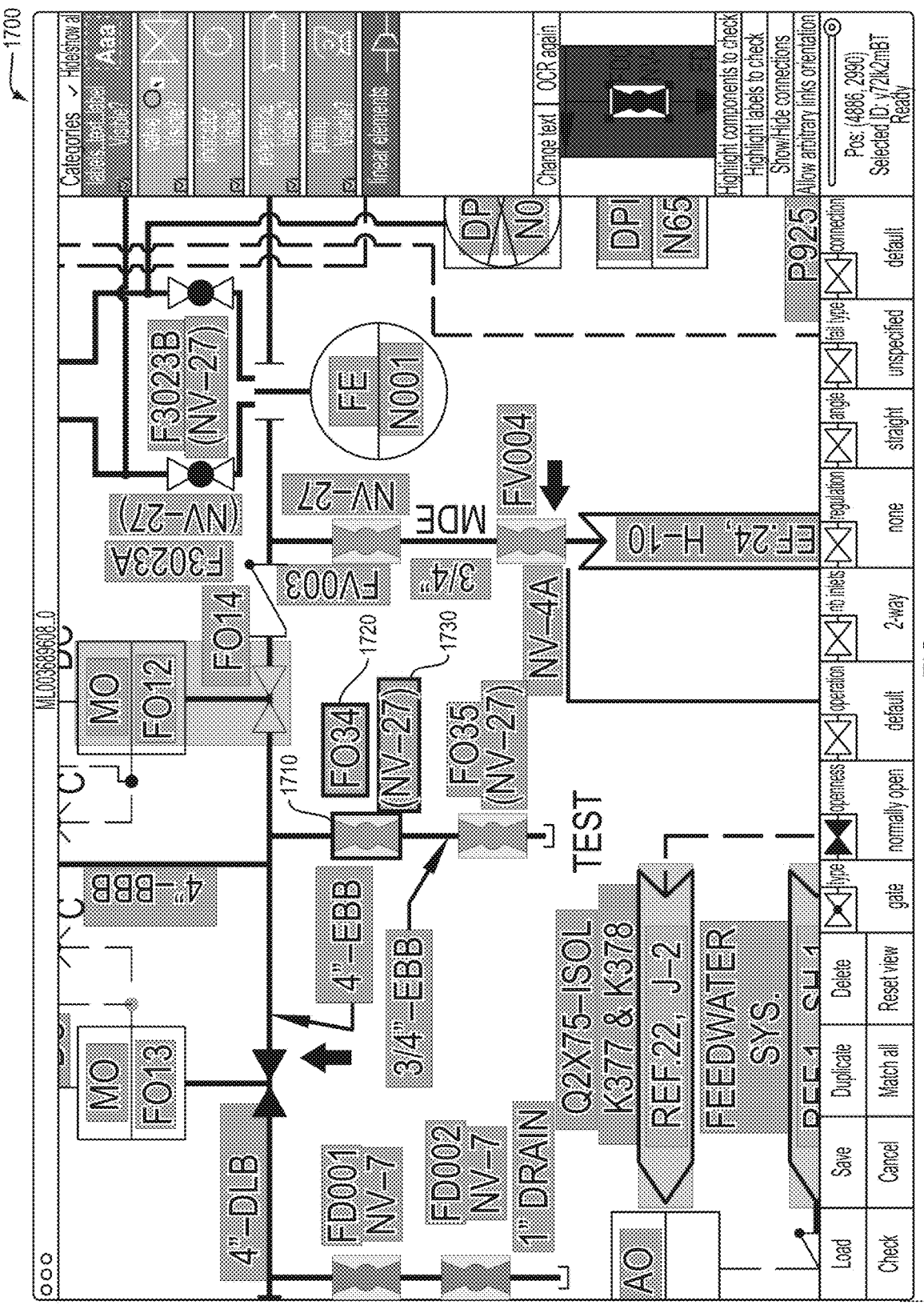
FIG. 17 is a screen shot of the user interface of an example labeling application showing forming text associations.

At step 390, the labeling application 200 associates at least some of the text boxes with respective symbols or connections in the P&ID thereby establishing text associations. This step may vary depending upon whether the labeling is part of generating a labeled dataset used as input for training a machine learning algorithm of a P&ID data extraction application or as part of correcting errors to predicted labels output by the machine learning algorithm of the P&ID data extraction application. Where the step 390 is performed as part of generating a labeled dataset, there may be no exiting associations. Alternatively, where it is part of correcting errors to predicted labels, there may be existing predicted associations and the step may correct the predicted associations. The user may select a symbol or connection and then select one or more text boxes to be associated therewith, linking them together. When a symbol, connection, or text box is selected the items associated with it may be highlighted to enable quick review of associations. A text box may be associated with multiple symbols or connections, and a symbol or connection may be associated with multiple text boxes. To speed up the association process, the labeling application 200 may automatically associate text boxes with symbols where their respective bounding boxes overlap. FIG. 17 is a screen shot 1700 of the user interface of an example labeling application 200 showing forming text associations. In this example, the user has selected the symbol 1710 for a valve and then indicated it should be associated with two text boxes 1720, 1730 by pressing a key on a keyboard and selecting the respective text boxes with a pointer.

At step 395, the labeling application 200 stores the machine-readable labels for text boxes, symbols, and connections, and the associations therebetween, in a machine-readable format. The machine-readable format may be separate from the image-only format, for example, a JSON file related to, but separate from, the JPG file, PNG file, or image-only PDF file that includes the P&ID image. Alternative, the machine-readable format may be integrated into a file that stores the P&ID image. Depending on the use case, the machine-readable format may be provided as input for training a machine learning algorithm of a P&ID data extraction application or may be provided to design and modeling applications (e.g., for use in building a model/digital twin).

It should be understood that while the steps 300 are shown in a sequence, the steps 300 can be performed in a variety of different orders. Some steps 300 may be performed only in part at a given time, and such partial performances interleaved with performance of other steps or portions thereof. For example, some text boxes in the P&ID may be labeled, then some symbols may be labeled, then some more text boxes may be labeled, then some more symbols may be labeled, and so forth. Further, some steps 300 may be omitted. For example, there may be no labels for text boxes that require correction, and correction sub-step 324 may be omitted.

In general, it should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for assigning machine-readable labels to a piping and instrumentation drawing (P&ID) in image-only format, comprising:

labeling one or more text boxes in the P&ID at least in part by displaying, in a user interface of a labeling application executing on a computing device, a predicted bounding box and predicted machine-readable text for each of the text boxes, and for at least one of the one or more text boxes, receiving, in the user interface, a correction to the predicted bounding box or predicted machine-readable text and updating the predicted bounding box or predicted machine-readable text;

labeling one or more symbols in the P&ID at least in part by
drawing, in response to user input in the user interface, a bounding box in a view of the P&ID around a given symbol,
assigning the given symbol a class of equipment in response to user input in the user interface,
based on the drawn bounding box and the class of equipment from the user input, automatically detecting one or more other symbols in the P&ID that correspond to the given symbol, placing a bounding box around each of the one or more other symbols, and assigning the class of equipment to each of the one or more other symbols, and
for at least one of the one or more other symbols, receiving, in the user interface, a correction of the automatically placed bounding box or assigned class of equipment and updating the automatically placed bounding box or assigned class of equipment;
labeling one or more connections in the P&ID at least in part by
defining connection points at corresponding symbols in response to user input in the user interface, and
creating a connection between the connection points;
associating one or more of the text boxes with a respective symbol or connection in the P&ID; and
storing, in a machine-readable format in a memory of the computing device, the labels for the one or more text boxes, symbols, and connections, and the associations therebetween.

2. The method of claim 1, wherein the labeling one or more text boxes, the labeling one or more symbols and the labeling one or more connections is performed as part of generating a labeled dataset for training a machine learning algorithm of a P&ID data extraction application, and the method further comprises:
providing the machine-readable format as a training input to the machine learning algorithm of the P&ID data extraction application.

3. The method of claim 1, wherein the labeling one or more text boxes, the labeling one or more symbols and the labeling one or more connections is performed as part of correcting errors to predicted labels of output of a machine learning algorithm of a P&ID data extraction application, and the machine-readable format is a corrected output of the P&ID data extraction application.

4. The method of claim 1, wherein the labeling one or more text boxes in the P&ID further comprises:
determining the predicted bounding box and predicted machine-readable text for each of the text boxes by an optical character recognition (OCR) algorithm.

5. The method of claim 1, wherein the labeling one or more text boxes in the P&ID further comprises:
receiving, in the user interface, a confirmation one or more of the predicted bounding boxes or predicted machine-readable text is correct, and
wherein each text box is marked with a flag until a corresponding correction to the predicted bounding box or predicted machine-readable text is received, or a corresponding confirmation the predicted bounding box or predicted machine-readable text is correct is received.

6. The method of claim 1, wherein the labeling one or more symbols in the P&ID further comprises:
wherein each of the one or more other symbols is marked with a flag until a corresponding correction to the automatically detected bounding box or automatically assigned class of equipment is received, or a corresponding confirmation the predicted bounding boxes or predicted machine-readable text is correct is received.

7. The method of claim 1, wherein the labeling one or more symbols in the P&ID further comprises:
in response to user input in the user interface, duplicating the bounding box around the given symbol to be around another symbol and copying the class of equipment to be assigned to the another symbol.

8. The method of claim 1, further comprising:
labeling properties of one or more symbols in the P&ID at least in part by
selecting, in response to user input in the user interface, a value of a property on a property list for each of the one or more symbols.

9. The method of claim 1, further comprising:
labeling properties of connections in the P&ID at least in part by
selecting, in response to user input in the user interface, a value of each property on a property list for one or more of the connections, wherein each property initially is set to a default value.

10. The method of claim 1, further comprising:
detecting a collision when more than a predefined percentage of a first bounding box is contained within a second bounding box for a text box or symbol; and
automatically deleting the first bounding box in response to detecting the collision.

11. The method of claim 1, wherein the associating further comprising:
detecting a bounding box for a text box is enclosed by the bounding box for a particular symbol; and
automatically associating the text box with the particular symbol in response to detecting the enclosure.

12. The method of claim 1, wherein the user interface includes a main window showing the view of the P&ID, and a zoom-in section window showing a zoomed in view of the P&ID, wherein user input is enterable in either the main window or the zoom-in section window.

13. A computing device comprising:
a display screen;
a processor; and
a memory coupled to the processor and configured to store a piping and instrumentation drawing (P&ID) in image-only format and a labeling application, the labeling application when executed operable to:
load the piping and instrumentation drawing (P&ID),
label one or more text boxes in the P&ID,
label one or more symbols in the P&ID in response to user input that draws a bounding box around a given symbol in a view of the P&ID and user input that assigns the given symbol a class of equipment,
label one or more other symbols in the P&ID in response to automatic detection of the one or more other symbols in the P&ID that correspond to the given symbol, wherein the automatic detection of the one or more other symbols in the P&ID that correspond to the given symbol places a bounding box around each of the one or more other symbols and assigns the class of equipment to each of the one or more other symbols,
label one or more connections in the P&ID,
associate one or more of the text boxes with a respective symbol or connection in the P&ID, and
store, in a machine-readable format in the memory, the labels for the one or more text boxes, symbols, and connections, and the associations therebetween.

14. The computing device of claim 13, wherein the labeling application is further operable to label the one or more text boxes in the P&ID by operations to:
    determine a predicted bounding box and predicted machine-readable text for each of the text boxes by an optical character recognition (OCR) algorithm,
    display on the display screen a predicted bounding box and predicted machine-readable text for each of the text boxes, and
    for at least one of the one or more text boxes, receive a correction to the predicted bounding box or predicted machine-readable text and update the predicted bounding box or predicted machine-readable text.

15. The computing device of claim 13, wherein the labeling application is further operable to label one or more connections in the P&ID by operations to:
    define connection points at corresponding symbols, and
    create a connection between the connection points.

16. A non-transitory computing device readable medium having instructions stored thereon, the instructions when executed by one or more computing devices operable to:
    label one or more text boxes in a piping and instrumentation drawing (P&ID);
    label one or more symbols in the P&ID at least in part by
        drawing, in response to user input, a bounding box around a given symbol in a view of the P&ID,
        assigning the given symbol a class of equipment in response to user input,
        automatically detecting one or more other symbols in the P&ID that correspond to the given symbol based on the drawn bounding box and the class of equipment, placing a bounding box around each of the one or more other symbols, and assigning the class of equipment to each of the one or more other symbols; and
        for at least one of the one or more other symbols, receiving from a user a correction of the automatically placed bounding box or assigned class of equipment and updating the automatically placed bounding box or assigned class of equipment;
    label one or more connections in the P&ID;
    associate one or more of the text boxes with a respective symbol or connection in the P&ID; and
    store, in a machine-readable format, the labels for the one or more text boxes, symbols, and connections, and the associations therebetween.

17. The non-transitory electronic-device readable medium of claim 16, wherein the instructions when executed are further operable to:
    provide the machine-readable format as a training input to a P&ID data extraction application that uses a machine learning algorithm.

18. The non-transitory electronic-device readable medium of claim 16, wherein the instructions when executed are further operable to:
    provide the machine-readable format as a corrected output of a P&ID data extraction application that uses a machine learning algorithm.

* * * * *

UNITED STATES PATENT AND TRADEMARK OFFICE
CERTIFICATE OF CORRECTION

| | |
|---|---|
| PATENT NO. | : 11,842,035 B2 |
| APPLICATION NO. | : 17/128912 |
| DATED | : December 12, 2023 |
| INVENTOR(S) | : Karl-Alexandre Jahjah et al. |

It is certified that error appears in the above-identified patent and that said Letters Patent is hereby corrected as shown below:

On the Title Page

(54) Reads:
"TECHNIQUES FOR LABELING, REVIEWING AND CORRECTING LABEL PREDICTIONS FOR PANDIDS"
Should read:
--TECHNIQUES FOR LABELING, REVIEWING AND CORRECTING LABEL PREDICTIONS FOR P&IDS--

In the Specification

Column 1, Line 3 reads:
"TECHNIQUES FOR LABELING, REVIEWING AND CORRECTING LABEL PREDICTIONS FOR PANDIDS"
Should read:
--TECHNIQUES FOR LABELING, REVIEWING AND CORRECTING LABEL PREDICTIONS FOR P&IDS--

Column 9, Line 18:
"existing predicted connection points, is and the defining may"
Should read:
--existing predicted connection points, and the defining may--

Signed and Sealed this
Eighth Day of October, 2024

Katherine Kelly Vidal
*Director of the United States Patent and Trademark Office*